(12) United States Patent
Zhai

(10) Patent No.: US 11,481,058 B2
(45) Date of Patent: Oct. 25, 2022

(54) TOUCH DISPLAY DEVICE, TOUCH DISPLAY PANEL, ARRAY SUBSTRATE AND DRIVING METHOD

(71) Applicant: Shanghai Tianma Micro-Electronics Co., Ltd., Shanghai (CN)

(72) Inventor: Yingteng Zhai, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/367,638

(22) Filed: Jul. 6, 2021

(65) Prior Publication Data
US 2021/0397286 A1 Dec. 23, 2021

(30) Foreign Application Priority Data
Aug. 20, 2020 (CN) .......................... 202010842534.4

(51) Int. Cl.
G06F 3/041 (2006.01)
G06F 3/044 (2006.01)
G09F 9/33 (2006.01)

(52) U.S. Cl.
CPC .......... *G06F 3/0412* (2013.01); *G06F 3/0443* (2019.05); *G06F 3/04166* (2019.05); *G09F 9/33* (2013.01)

(58) Field of Classification Search
CPC .... G06F 2203/041–04114; G06F 3/041–0412; G06F 3/0443; G06F 3/0445; H01L 27/323; G09F 9/33
See application file for complete search history.

(56) References Cited

U.S. PATENT DOCUMENTS

| | | | |
|---|---|---|---|
| 10,997,899 B1* | 5/2021 | Bae | G09G 3/2092 |
| 2014/0240618 A1* | 8/2014 | Oraw | G06F 3/0443 |
| | | | 349/12 |
| 2016/0019827 A1* | 1/2016 | Lee | G06F 3/04182 |
| | | | 345/204 |
| 2016/0117039 A1 | 4/2016 | Zhao | |
| 2019/0012012 A1* | 1/2019 | Lai | H01L 33/36 |

(Continued)

FOREIGN PATENT DOCUMENTS

| | | |
|---|---|---|
| CN | 104298404 B | 5/2017 |
| CN | 110515495 A | 11/2019 |

*Primary Examiner* — Sanjiv D. Patel
(74) *Attorney, Agent, or Firm* — Kilpatrick Townsend & Stockton, LLP

(57) ABSTRACT

The disclosure provides a touch display device, a touch display panel, a touch display panel and a driving method. The touch display panel includes a first substrate, multiple micro light emitting devices, multiple micro driving devices and multiple touch driving electrodes. Each micro driving device corresponds to the multiple micro light emitting devices to drive the multiple micro light emitting devices to emit light. At least one touch driving electrode corresponds to at least one micro driving device. The touch driving electrode receives a signal transmitted to a corresponding micro driving device as a touch driving signal, or, the touch driving electrode receives a signal outputted by the corresponding micro driving device as the touch driving signal. Therefore, there is no need for a main driver chip to provide the touch driving signal to the touch driving electrode. Thus, the power consumption of the main driver chip is greatly reduced.

20 Claims, 20 Drawing Sheets

(56) References Cited

U.S. PATENT DOCUMENTS

| | | | |
|---|---|---|---|
| 2020/0033979 A1* | 1/2020 | Sauer | G09G 3/32 |
| 2020/0064950 A1* | 2/2020 | Kim | G06F 3/04184 |
| 2021/0064212 A1 | 3/2021 | Huang et al. | |

* cited by examiner

TOUCH DISPLAY DEVICE, TOUCH DISPLAY PANEL, ARRAY SUBSTRATE AND DRIVING METHOD

CROSS REFERENCE OF RELATED APPLICATION

The present application claims priority to Chinese Patent Application No. 2020108 42534.4, titled "TOUCH DISPLAY DEVICE, TOUCH DISPLAY PANEL, ARRAY SUBSTRATE AND DRIVING METHOD", filed on Aug. 20, 2020 with the China National Intellectual Property Administration, which is incorporated herein by reference in its entirety.

FIELD

The present disclosure relates to the field of display technology, and in particular, to a touch display device, a touch display panel, an array substrate and a driving method.

BACKGROUND

With the development of science and technology, a display panel integrated with a touch panel has become an indispensable part of a display device. In conventional technology, the touch panel is generally added to the display panel directly to realize a touch display function. Further, a touch driving electrode and a touch sensing electrode of the touch panel are generally connected to a main driving chip of the display panel to provide a touch driving signal for the touch driving electrode through the main driving chip, to detect a touch position. Hence, the main driving chip not only needs to provide a signal required for the display panel, but also provides the touch driving signal for the touch driving electrode. Therefore, a power consumption of the main driving chip is relative high, which is not conducive to the application of the touch display panel.

SUMMARY

In view of the above, a touch display device, a touch display panel, an array substrate and a driving method are provided according to the present disclosure to reduce a power consumption of a main driving chip.

An array substrate is provided according to the present disclosure. The array substrate includes
a first substrate; and
multiple micro light emitting devices, multiple micro driving devices and multiple touch driving electrodes, arranged on a side of the first substrate, where
each of the multiple micro driving devices corresponds to the multiple micro light emitting devices to drive the multiple micro light emitting devices to emit light;
at least one of the multiple touch driving electrodes corresponds to at least one of the multiple micro driving devices; and
the at least one of the multiple touch driving electrode receives a signal transmitted to a corresponding micro driving device as a touch driving signal, or, the at least one of the multiple touch driving electrode receives a signal outputted by the corresponding micro driving device as the touch driving signal.

A touch driving method of an array substrate is provided according to the present disclosure. The array substrate includes multiple micro light emitting devices, multiple micro driving devices and multiple touch driving electrodes, and the method includes:

receiving a signal by a micro driving device; and
multiplexing, by a touch driving electrode, a signal of a micro driving device arranged corresponding to said touch driving electrode as a touch driving signal;
or
outputting a signal by a micro driving device; and using, by a touch driving electrode, a signal outputted by a micro driving device arranged corresponding to said touch driving electrode as a touch driving signal.

A touch display panel including an array substrate and a color filter substrate arranged opposite to the array substrate is provided according to the present disclosure. The array substrate is the array substrate described above.

A touch display device including the touch display panel described above is further provided according to the present disclosure.

Compared with the conventional technology, solutions of the present disclosure have the following embodiments in the touch display device, the touch display panel, the array substrate and the driving method provided according to the present disclosure, the array substrate includes multiple micro light emitting devices and multiple micro driving devices configured to drive the multiple micro light emitting devices to emit light. Since at least one touch driving electrode corresponds to at least one micro driving device, and the touch driving electrode receives the signal transmitted to the corresponding micro driving device as the touch driving signal, or, the touch driving electrode receives the signal outputted by the corresponding micro driving device as the touch driving signal, there is no need for the main driver chip to provide the touch driving signal to the touch driving electrode. Thus, the power consumption of the main driver chip is greatly reduced. Therefore, the power consumptions of the array substrate, the touch display panel and the touch display device are reduced.

BRIEF DESCRIPTION OF THE DRAWINGS

The drawings to be used in the description of the embodiments of the disclosure will be described briefly as follows, It is apparent that the drawings in the following description only illustrate some embodiments of the present disclosure.

DETAILED DESCRIPTION OF EMBODIMENTS

The embodiments of the present disclosure are clearly and completely described below in conjunction with the drawings of the embodiments of the present disclosure. Apparently, the embodiments described in the following are only some embodiments of the present disclosure, rather than all the embodiments.

Figure 1:
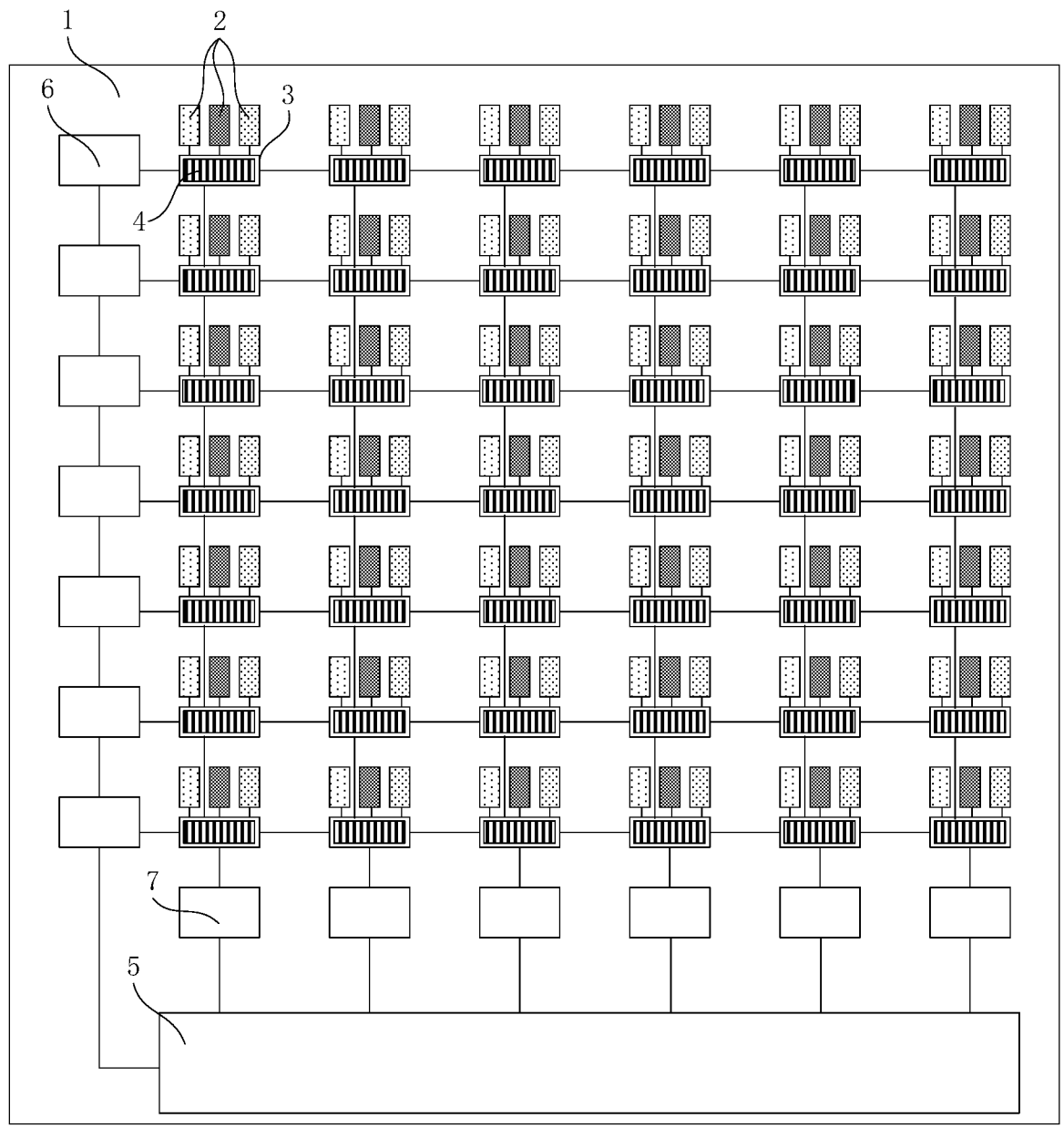
FIG. 1 is a top view structure diagram of an array substrate according to an embodiment of the present disclosure.

An array substrate is provided according to an embodiment of the present disclosure. As shown in FIG. 1 which is a top view structure diagram of an array substrate according to an embodiment of the present disclosure, the array substrate includes a first substrate 1, multiple micro light emitting devices 2, multiple micro driving devices 3 and multiple touch driving electrodes 4, and the multiple micro light emitting devices 2, the multiple micro driving devices 3 and the multiple touch driving electrodes 4 are arranged on a side of the first substrate 1.

Each micro driving device 3 is arranged corresponding to the multiple micro light emitting devices 2, and the micro driving device 3 is configured to drive the multiple micro light emitting devices 2 to emit light. In an embodiment, the micro light emitting device 2 is a Micro-LED and the like. It should be noted that in embodiments of the present disclosure, only an array arrangement of the multiple micro driving devices 3 is taken as an example for description, and the present disclosure is not limited to this.

In an embodiment, as shown in FIG. 1, each micro driving device 3 is arranged corresponding to three micro light emitting devices 2. That is, each micro driving device 3 is connected to three micro light emitting devices 2 respectively, to drive the three micro light emitting devices 2 to emit light. In an embodiment, the three micro light emitting devices 2 may emit red light, green light and blue light respectively. In one embodiment, the present disclosure is not limited to this. In other embodiments, each micro driving device 3 may also be connected to two, four, five or even more micro light emitting devices 2, which is not repeated herein.

In the embodiment of the present disclosure, at least one touch driving electrode 4 is arranged corresponding to at least one micro driving device 3. In some embodiments, one touch driving electrode 4 may be arranged corresponding to one micro driving device 3. As shown in FIG. 1, in a direction perpendicular to the first substrate 1, a projection of one micro driving device 3 overlaps with a projection of one touch driving electrode 4.

In other embodiments, one touch driving electrode 4 may also be arranged corresponding to multiple micro driving devices 3. As show in FIG. 2 which is a top view structure diagram of an array substrate according to another embodiment of the present disclosure, in the direction perpendicular to the first substrate 1, a projection of one touch driving electrode 4 overlaps with projections of two micro driving devices 3.

Figure 3:
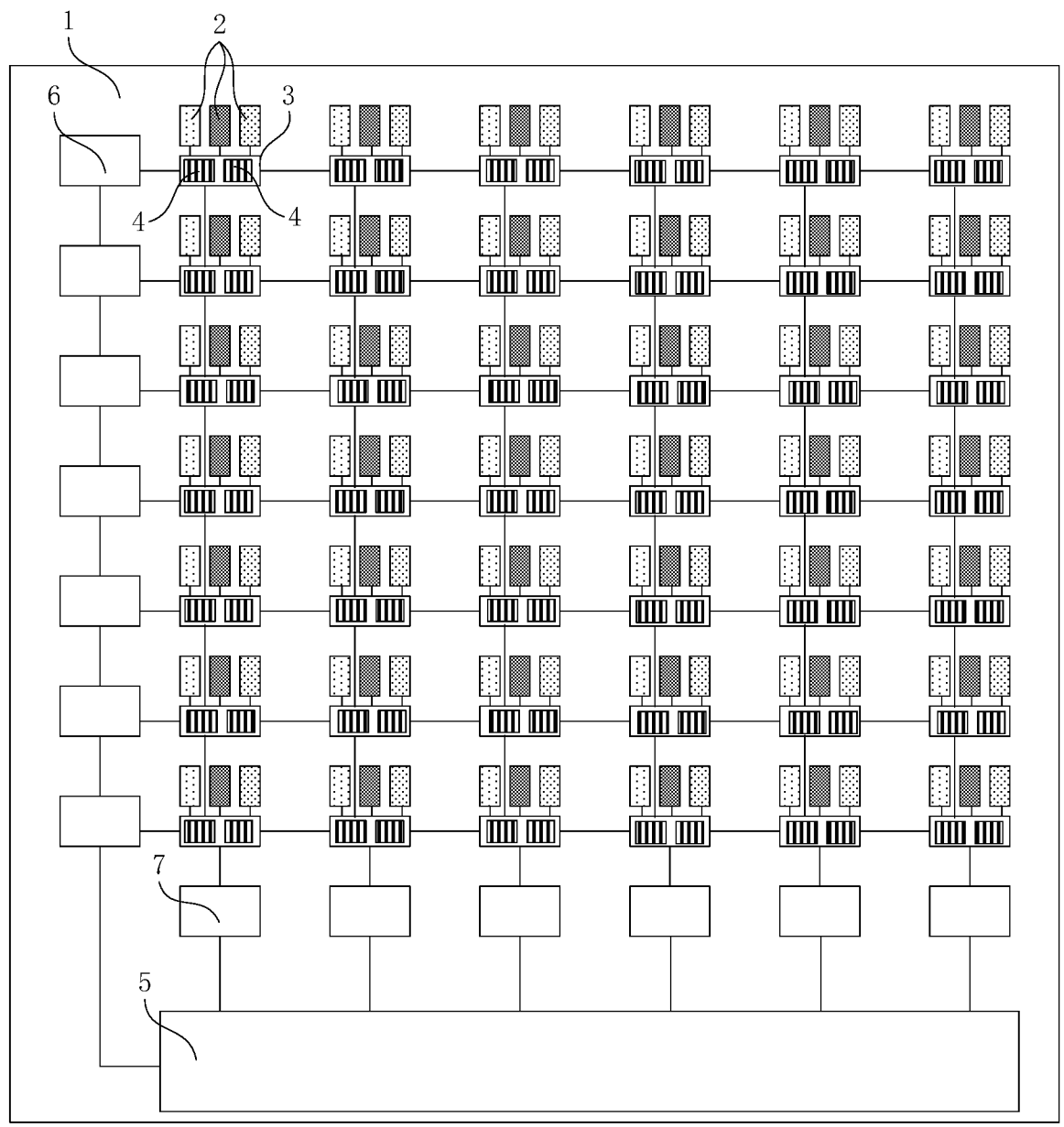
FIG. 3 is a top view structure diagram of an array substrate according to another embodiment of the present disclosure.

In other embodiments, multiple touch driving electrodes 4 may also be arranged corresponding to one micro driving device 3. As shown in FIG. 3 which is a top view structure diagram of an array substrate according to another embodiment of the present disclosure, in the direction perpendicular to the first substrate 1, projections of two touch driving electrodes 4 overlap with the projection of one micro driving device 3.

Figure 2:
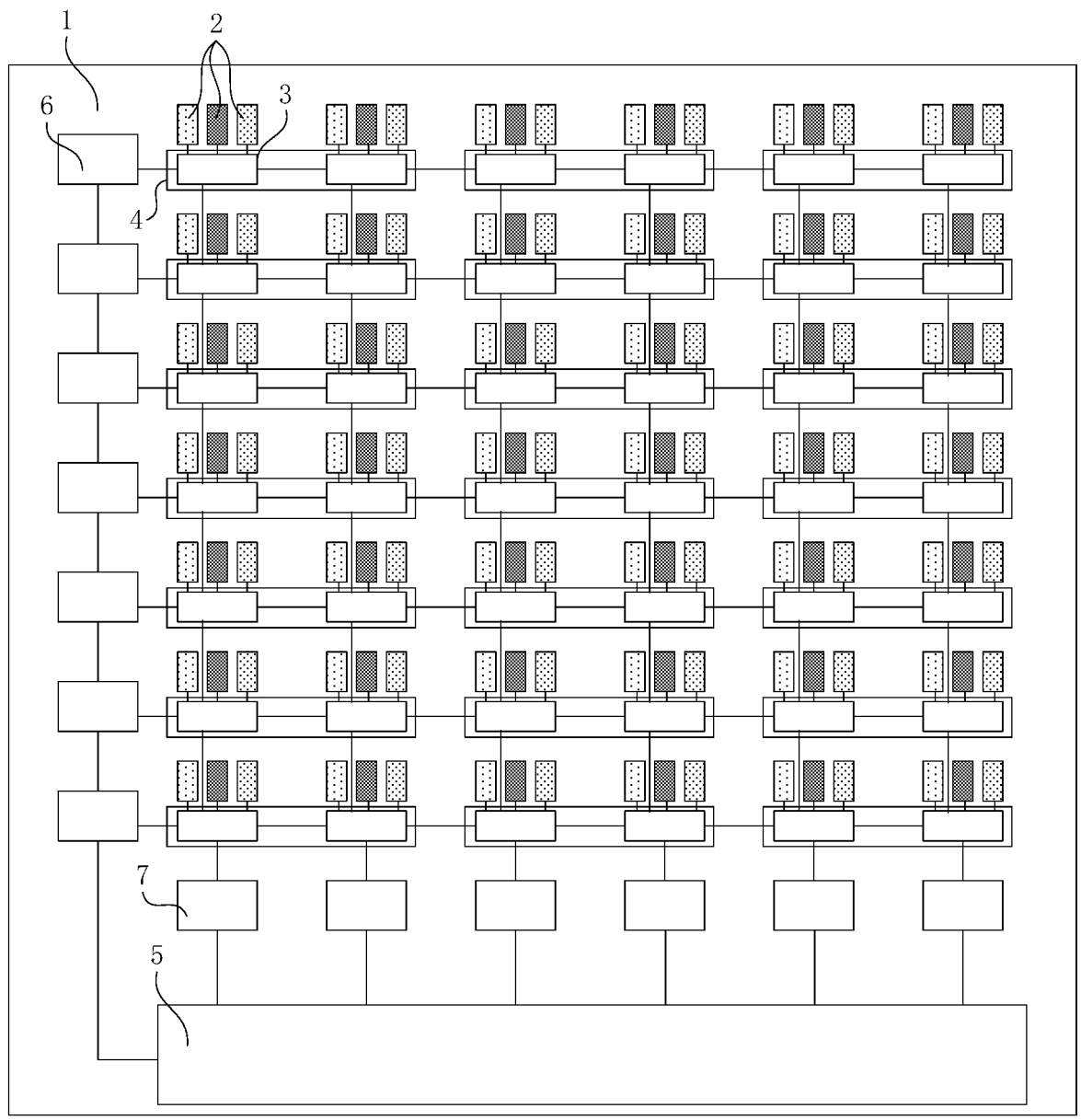
FIG. 2 is a top view structure diagram of an array substrate according to another embodiment of the present disclosure.
Figure 4:
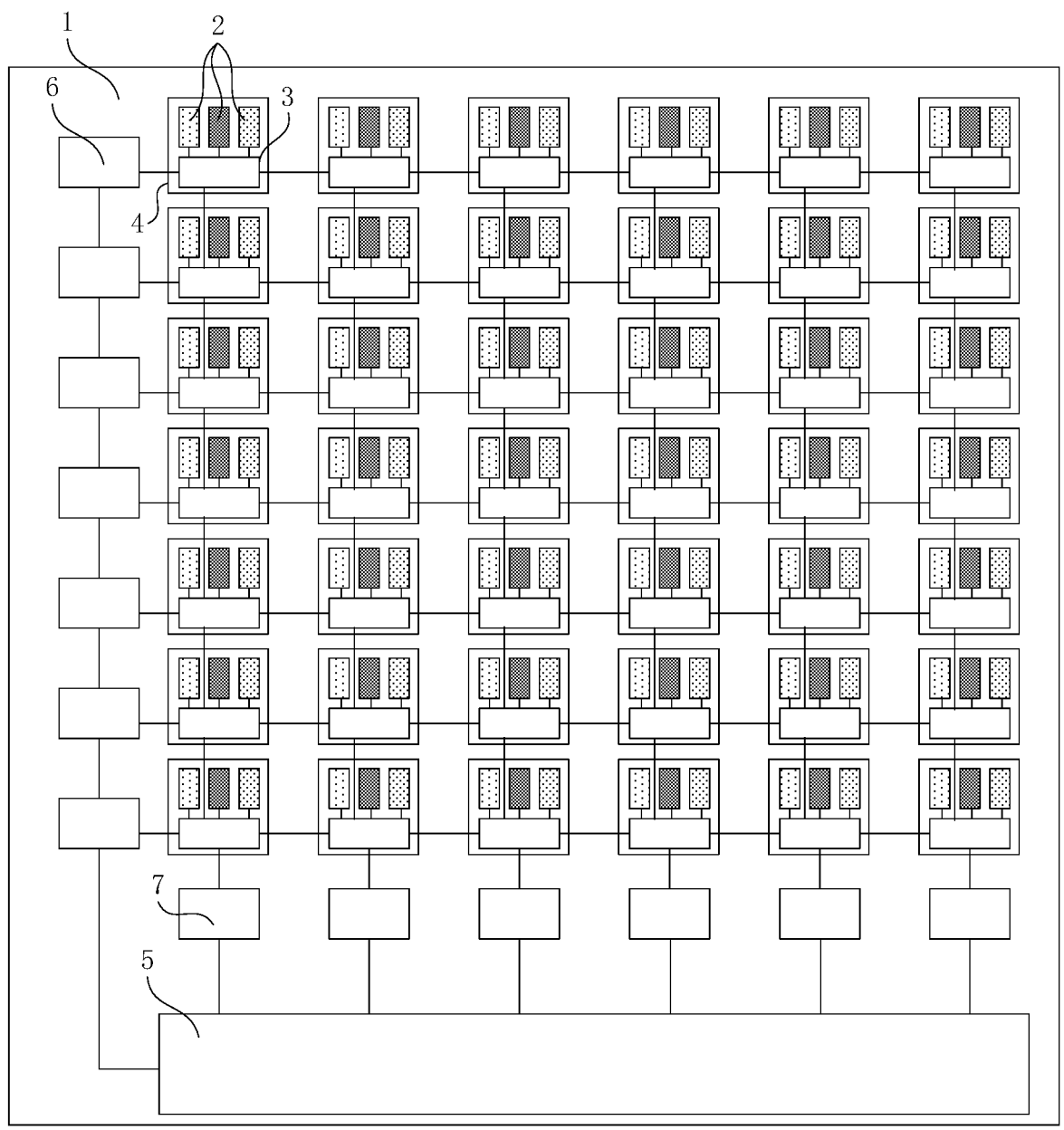
FIG. 4 is a top view structure diagram of an array substrate according to another embodiment of the present disclosure.

In the structures shown in FIG. 1 to FIG. 3, only the projection of the touch driving electrode 4 only overlapping with the projection of the micro driving device 3 is taken as example for description, and the present disclosure is not limited to this. In other embodiments, as shown in FIG. 4 which is a top view structure diagram of an array substrate according to another embodiment of the present disclosure, the projection of the touch driving electrode 4 may further overlap with a projection of a micro light emitting device 2.

That is, in the embodiments of the present disclosure, a corresponding arrangement of the touch drive electrode 4 and the micro drive device 3 is not a correspondence of a position relationship, but a correspondence of a signal transmission relationship. Namely, the touch driving electrode 4 receives a signal of the micro driving device 3 arranged corresponding to said touch driving electrode 4, and the projection of the touch driving electrode 4 may overlap with the projection of the micro driving device 3 arranged corresponding to said touch driving electrode 4 or a projection of another component such as the micro light emitting device 2. A position relation between the touch driving electrode 4 and the micro driving device 3 may be determined based on a parameter such as dimensions of the touch driving electrode 4 and the micro driving device 3, which is not repeated herein.

Since at least one touch driving electrode 4 is arranged corresponding to at least one micro driving device 3, the touch driving electrode 4 may multiplex a signal transmitted to the micro driving device 3 arranged corresponding to said touch driving electrode 4 as a touch driving signal in some embodiments of the present disclosure. That is, each touch driving electrode 4 receives the signal transmitted to the micro driving device 3 arranged corresponding to said touch driving electrode 4 as the touch driving signal. In this way, there is no need for a main driving chip to specifically generate the touch driving signal, which greatly reduces the power consumption of the main driving chip.

In one embodiment, the present disclosure is not limited to this. In some embodiments of the present disclosure, the touch driving signal may be generated by the micro driving device 3. That is, each touch driving electrode 4 receives a signal outputted by the micro driving device 3 arranged corresponding to said touch driving electrode 4 as the touch driving signal. Since the touch driving signal of each touch driving electrode 4 is generated by the micro driving device 3 arranged corresponding to said touch driving electrode 4, there is no need for the main driving chip to generate the touch driving signal, which greatly reduces the power consumption of the main driving chip. In addition, each micro driving device 3 is only required to generate the touch driving signal for the touch driving electrode 4 arranged corresponding to said micro driving device 3, hence, for an array substrate including multiple micro driving devices 3, the power consumption of each micro driving device 3 is not high, so that the power consumption of the entire array substrate is also relatively low.

In the embodiments of the present disclosure, as shown in FIG. 1 to FIG. 4, the array substrate further includes a main driving chip 5, multiple row driving devices 6 and multiple column driving devices 7. The main driving chip 5 is configured to receive image data inputted from outside, determine a scanning signal and a data signal based on the image data, transmit the scanning signal to the row driving devices 6, and transmit the data signal to the column driving devices 7.

In one embodiment, as shown in FIG. 4, each row driving device 6 is connected to the micro driving devices 3 in one row. The row driving device 6 activates the micro driving devices 3 in said row by inputting a first sub-signal to a row of micro driving devices 3 connected to said row driving device 6, so that the micro driving devices 3 in said row receive a data signal outputted by a corresponding column driving device 7. Each row driving device 6 inputs the first sub-signal to the micro driving devices 3 connected to said row driving device 6 in sequence, that is, the micro driving devices 3 receive and store the data signal outputted by the corresponding column driving device 7 row by row. Then, each row driving device 6 inputs a second sub-signal to a row of micro driving devices 3 connected to the row driving device 6. After receiving the second sub-signal, the micro driving device 3 drives the micro light emitting device 2 to emit light based on the received data signal.

Figure 5:
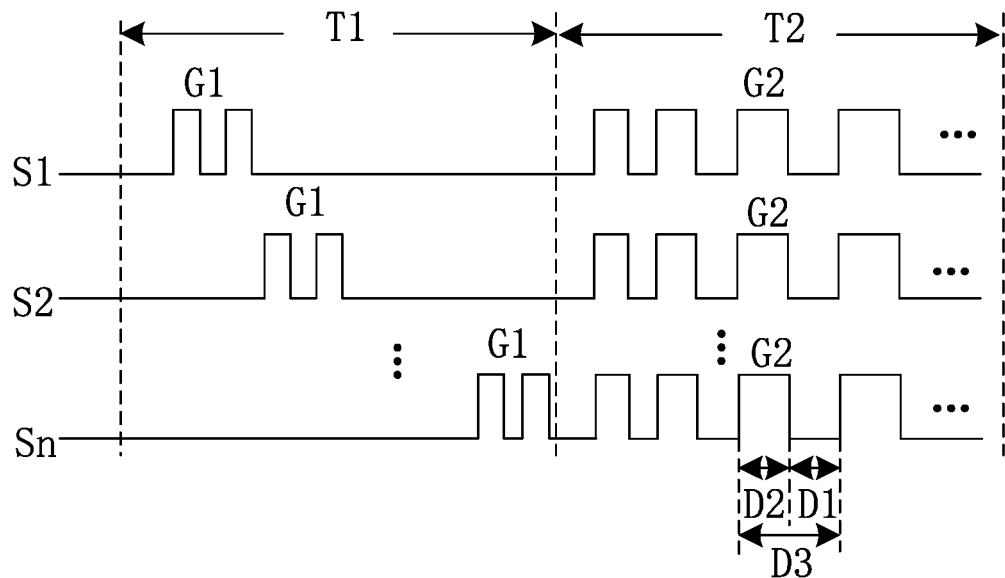
FIG. 5 is a timing diagram of scanning signals S1 to Sn in each row according to an embodiment of the present disclosure.

That is, in some embodiments of the present disclosure, as shown in FIG. 5 which is a timing diagram of scanning signals S1 to Sn in each row according to an embodiment of the present disclosure, the scanning signal includes a first sub-signal G1 and a second sub-signal G2. After receiving the first sub-signal G1, the micro driving device 3 receives the data signal of the micro light emitting device 2 arranged corresponding to said micro driving device 3. After receiving the second sub-signal G2, the micro driving device 3 drives the micro light emitting device 2 arranged corresponding to said micro driving device 3 to emit light based on the second sub-signal G2 and the data signal.

Figure 6:
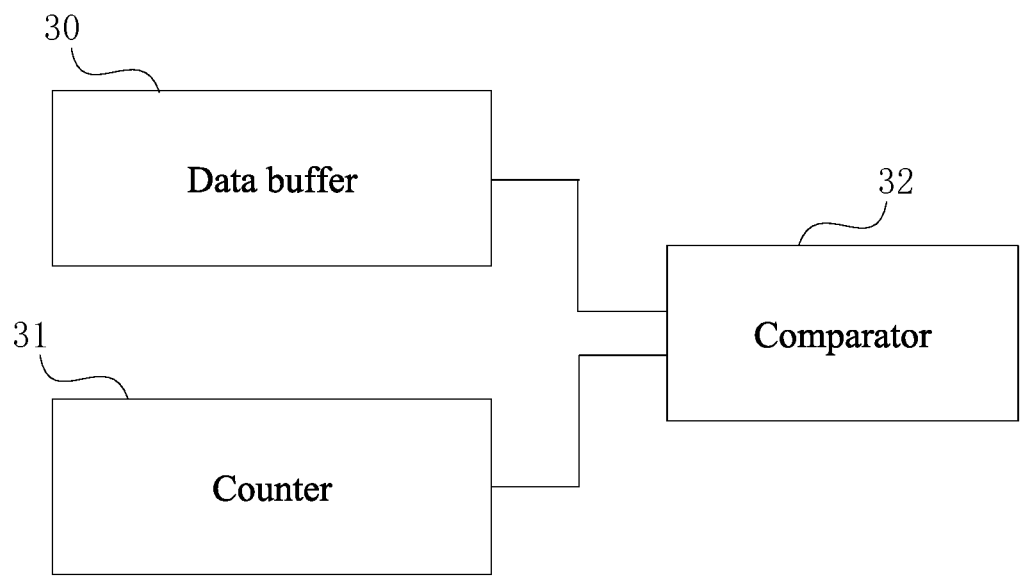
FIG. 6 is a schematic diagram of a circuit structure of a micro driving device according to an embodiment of the present disclosure.

In some embodiments of the present disclosure, as shown in FIG. 6 which is a schematic diagram of a circuit structure of a micro driving device 3 according to an embodiment of the present disclosure, the micro driving device 3 includes a data buffer 30, a counter 31 and a comparator 32. After the micro driving device 3 receives the first sub-signal G1, the data buffer 30 receives and stores the data signal of the micro light emitting device 2 connected to said micro driving device 3. After the counter 31 receives the second sub-signal G2, the comparator 32 outputs a digital counting signal indicating the number of edges of the second sub-signal G2, where the number of edges is equal to the number of rising edge, the number of falling edge or a sum of the number of the rising edge and the number of the falling edge. Further, the data buffer 30 outputs a digital data signal representing an expected grayscale of a micro light emitting device 2 to be driven to the comparator 32. The comparator 32 compares the digital data signal outputted by the data buffer 30 with the digital counting signal outputted by the counter 31. If the expected grayscale represented by the digital data signal is less than or equal to the number of edges indicated by the digital counting signal, a first signal is outputted to control the micro light emitting device 2 to emit light. If the expected grayscale represented by the digital data signal is greater than the number of edges indicated by the digital counting signal, a second signal is outputted to control the micro light emitting device 2 to stop emitting light.

Figure 7:
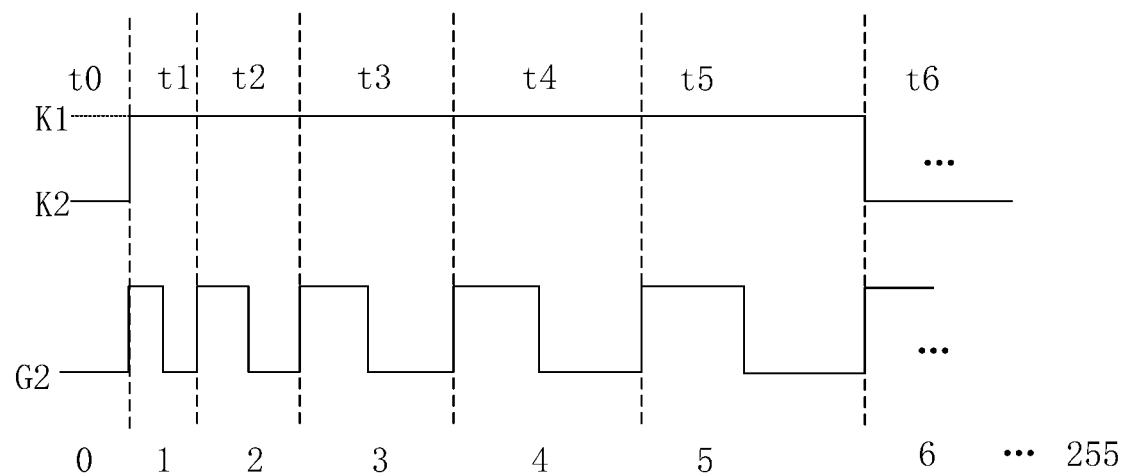
FIG. 7 is a timing diagram of a control signal of a micro driving device according to an embodiment of the present disclosure.

As shown in FIG. 7, FIG. 7 is a timing diagram of a control signal of a micro driving device 3 according to an embodiment of the present disclosure. Taking the expected grayscale equal to 5 as an example, the data buffer 30 outputs the digital data signal representing the expected grayscale 5 to the comparator 32, and the counter 31 outputs the digital counting signal indicating the number of edges of the second sub-signal G2 to the comparator 32. For example, during the t0 period, the counter 31 outputs a digital counting signal indicating that the number of edges is equal to 0 to the comparator 32. Since 0 is not greater than 5, the comparator 32 outputs a first control signal K1 to control the micro light emitting device 2 to emit light. During the t1 period, the counter 31 outputs a digital counting signal indicating that the number of edges is equal to 1 to the comparator 32. Since 1 is not greater than 5, the comparator 32 outputs the first control signal K1 to control the micro light emitting device 2 to emit light. During the t2 period, the counter 31 outputs a digital counting signal indicating that the number of edges is equal to 2 to the comparator 32. Since 2 is not greater than 5, the comparator 32 outputs the first control signal K1 to control the micro light emitting device 2 to emit light. During the t3 period, the counter 31 outputs a digital counting signal indicating that the number of edges is equal to 3 to the comparator 32. Since 3 is not greater than 5, the comparator 32 outputs the first control signal K1 to control the micro light emitting device 2 to emit light. During the t4 period, the counter 31 outputs a digital counting signal indicating that the number of edges is equal to 4 to the comparator 32. Since 4 is not greater than 5, the comparator 32 outputs the first control signal K1 to control the micro light emitting device 2 to emit light. During the t5 period, the counter 31 outputs a digital counting signal indicating that the number of edges is equal to 5 to the comparator 32. Since 5 is not greater than 5, the comparator 32 outputs the first control signal K1 to control the micro light emitting device 2 to emit light. During the t6 period, the counter 31 outputs a digital counting signal indicating that the number of edges is equal to 6 to the comparator 32. Since 6 is greater than 5, the comparator 32 outputs a second control signal K2 to control the micro light emitting device 2 to stop emitting light.

The longer the first control signal K1 received by the micro light emitting device 2 is, the longer the light-emitting time, the greater the brightness, and the greater the grayscale. It should be noted that the second sub-signal G2 includes 255 pulse signals representing 255 grayscales. It should also be noted that in order for people to perceive a difference between low grayscales, a brightness difference between two low grayscales may be relative small. In order for people to perceive a difference between high grayscales, a brightness difference between two high grayscales may be great. Based on the above, as shown in FIG. 5 and FIG. 7, a distance between edges (for example, the rising edges) of two adjacent pulse signals of the second sub-signal G2 may be increased gradually.

In some embodiments of the present disclosure, as shown in FIG. 5, the second sub-signal G2 includes at least two pulse signals that are different in pulse width. That is, a distance D3 between edges (for example, the rising edges) of two adjacent pulse signals may be increased gradually not only by increasing a distance D1 between two adjacent pulse signals gradually but also by increasing a width D2 of a pulse signal gradually, to increase the brightness difference between two low grayscales gradually. In one embodiment, the present disclosure is not limited to this. In other embodiments, the second sub-signal G2 may include at least two pulse signals with the same pulse width D2. That is, the grayscales may be distinguished only by increasing the distance D1 between two adjacent pulse signals.

In some embodiments of the present disclosure, the touch driving electrode 4 receives a scanning signal of the micro driving device 3 arranged corresponding to said touch driving electrode 4, and multiplexes the scanning signal as the touch driving signal, so that to reduce the power consumption of the main driving chip while meeting a touch driving requirement for the touch driving electrode 4.

In some embodiments of the present disclosure, the touch driving electrode 4 multiplexes the sub-signal G2 of the scanning signal as the touch driving signal. As shown in FIG. 5, since the micro driving devices 3 in all rows receive the second sub-signal G2 synchronously during the T2 period, and the touch driving electrode 4 multiplexes the second sub-signal G2 of the scanning signal as the touch driving signal, all touch driving electrodes 4 are made to perform touch detection synchronously.

It should also be noted that, as shown in FIG. 5, in some embodiments of the present disclosure, the first sub-signal G1 also includes multiple pulse signals. In one embodiment, the present disclosure is not limited to this. In other embodiments, the first sub-signal G1 may include one pulse signal, which is not repeated herein.

Figure 8:
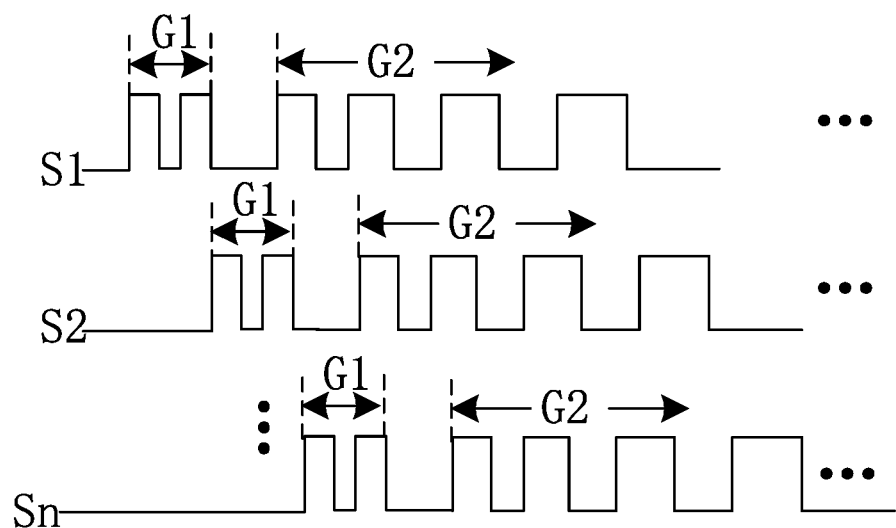
FIG. 8 is a timing diagram of scanning signals S1 to Sn in each row according to another embodiment of the present disclosure.

In some embodiments of the present disclosure, as shown in FIG. 5, after the micro driving devices 3 in all rows receive the first sub-signal G1, that is, the first sub-signal G1 is inputted to the micro driving devices 3 row by row during the T1 period, the second sub-signal G2 is inputted to the micro driving devices 3 in all rows during the T2 period. In one embodiment, the present disclosure is not limited to this. In other embodiments, as shown in FIG. 8 which is a timing diagram of scanning signals S1 to Sn in each row according to another embodiment of the present disclosure, after the micro driving devices 3 in each row receive the first sub-signal G1, the second sub-signal G2 is inputted to said micro driving devices 3 immediately. That is, the second sub-signals G2 of the micro driving devices 3 in different rows are not synchronized. In this case, the touch driving electrodes 4 receive the touch driving signal in a time division manner, that is, the touch driving electrodes 4 perform touch detection at different time.

Figure 9:
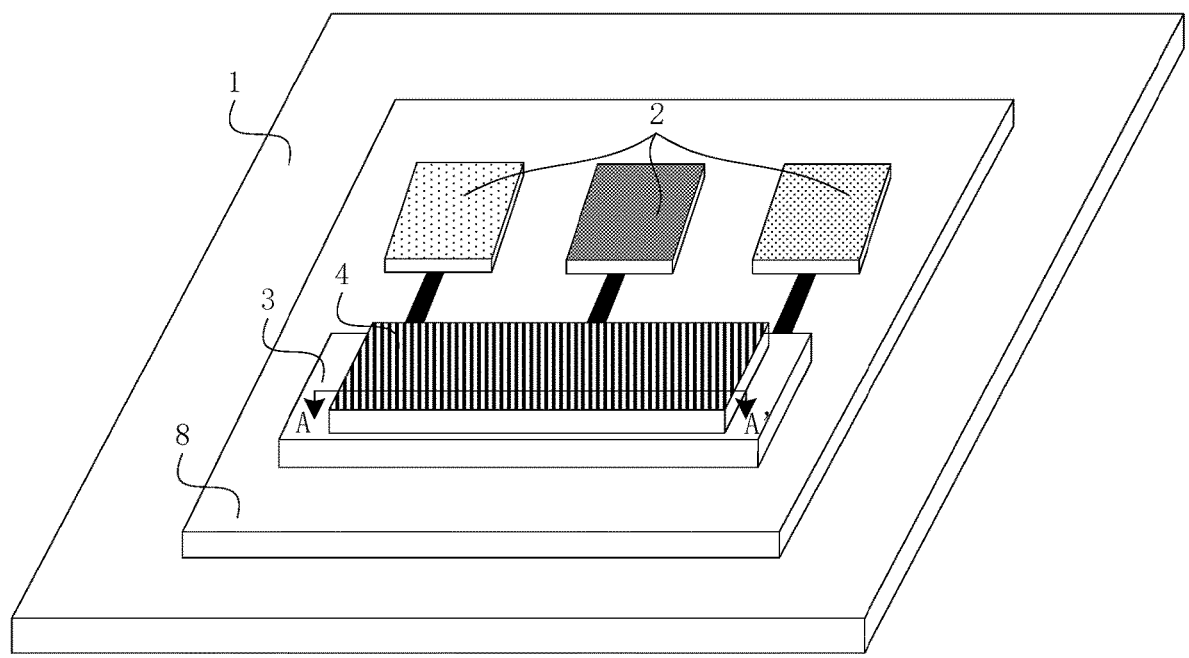
FIG. 9 is a three-dimensional schematic diagram of a partial structure of an array substrate according to an embodiment of the present disclosure.
Figure 10:
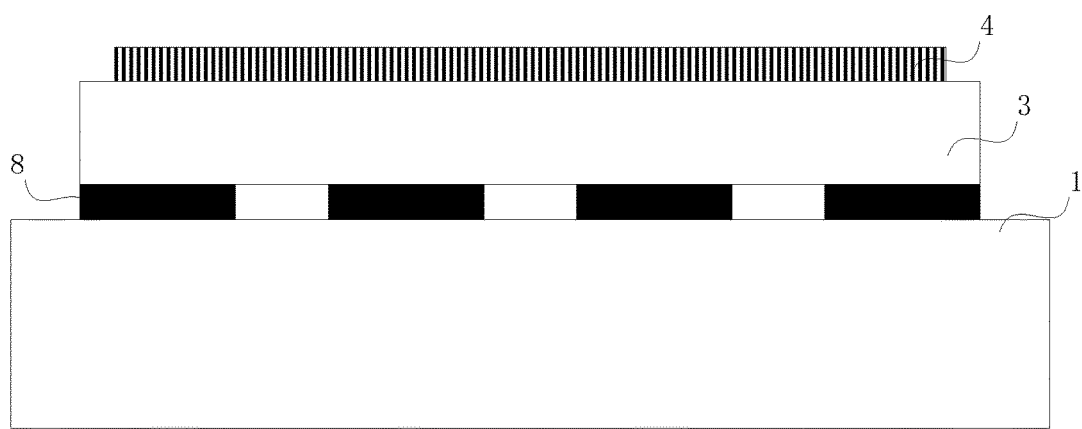
FIG. 10 is a schematic diagram of a cross-sectional structure of an array substrate along a cutting line AA' shown in FIG. 9 according to an embodiment of the present disclosure.

In some embodiments of the present disclosure, the micro driving device 3 is a Micro-IC. In some embodiments of the present disclosure, as shown in FIG. 9 and FIG. 10, where FIG. 9 is a three-dimensional schematic diagram of a partial structure of an array substrate according to an embodiment of the present disclosure and FIG. 10 is a schematic diagram of a cross-sectional structure of an array substrate along a cutting line AA' shown in FIG. 9 according to an embodiment of the present disclosure, since the Micro-IC is a chip architecture packaged or semi-packaged with an internal driving circuit integrated, the touch driving electrode 4 is arranged on a surface of the micro driving device 3 arranged corresponding to said touch driving electrode 4 on a side facing away from the first substrate 1, to simplify the design of the array substrate and reduce the power consumption of the main driving chip 5.

In one embodiment, the present disclosure is not limited to this. In other embodiments, the touch driving electrode 4 may not be arranged on the surface of the micro driving device 3 arranged corresponding to said touch driving electrode 4 on a side facing away from the first substrate 1, but arranged on a side of the micro driving device 3 arranged corresponding to said touch driving electrode 4 facing away from the first substrate 1. That is, there may be an insulation layer and the like between the touch driving electrode 4 and the micro driving device 3. In this case, the micro driving device 3 is not limited to the Micro-IC.

Since the touch driving electrode 4 is arranged on a side of the micro driving device 3 arranged corresponding to said touch driving electrode 4 facing away from the first substrate 1, and a wire connected to the micro driving device 3 and transmitting a signal to said micro driving device 3 is arranged on a side of the micro driving device 3 close to the first substrate 1, an interference of a signal in the wire at a bottom of the micro driving device 3 to the touch driving signal in the touch driving electrode 4 can be reduced.

Figure 11:
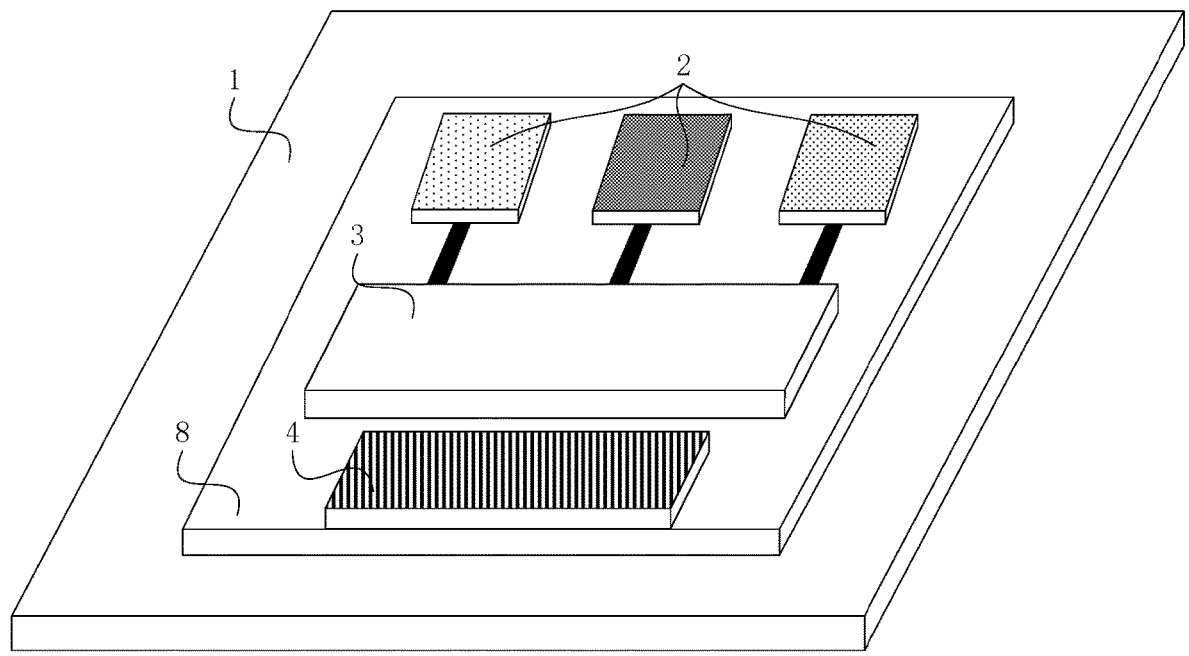
FIG. 11 is a three-dimensional schematic diagram of a partial structure of an array substrate according to another embodiment of the present disclosure.

In one embodiment, the present disclosure is not limited to this. In other embodiments, as shown in FIG. 11 which is a three-dimensional schematic diagram of a partial structure of an array substrate according to another embodiment of the present disclosure, the touch driving electrode 4 may also be arranged on a side of the micro driving device 3 close to the first substrate 1. For example, the touch driving electrode 4 is arranged on a pixel substrate 8 at the bottom of the micro driving device 3. In this case, other signals may be shielded by a shielding circuit and the like, to prevent other signals from interfering with the touch driving signal in the touch driving electrode 4.

It should be noted that the pixel substrate 8 is arranged between the first substrate 1 and the micro driving device 3. The pixel substrate 8 may include various ports of the micro driving device 3, an electrical interconnection structure for realizing the connection between the micro driving device 3 and the micro light emitting device 2, and an electrical interconnection structure for realizing the connection between the micro driving devices 3 and the like, which is not repeated herein.

Figure 12:
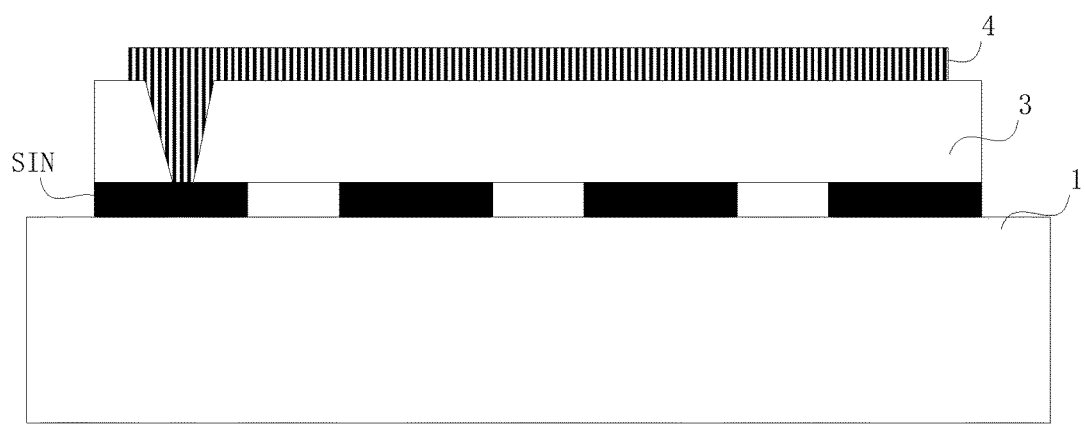
FIG. 12 is a schematic diagram of a cross-sectional structure of an array substrate along a cutting line AA' shown in FIG. 9 according to another embodiment of the present disclosure.

Based on any one of the above embodiments, in some embodiments of the present disclosure, as shown in FIG. 12 which is a schematic diagram of a cross-sectional structure of an array substrate along a cutting line AA' shown in FIG. 9 according to another embodiment of the present disclosure, the micro driving device 3 includes a scanning signal receiving terminal SIN, and the micro driving device 3 receives the scanning signal through the scanning signal receiving terminal SIN. The touch driving electrode 4 is electrically connected to a scanning signal receiving terminal SIN of the micro driving device 3 arranged corresponding to said touch driving electrode 4, to receive the scanning signal through the scanning signal receiving terminal SIN and multiplex the scanning signal as the touch driving signal.

Figure 13:
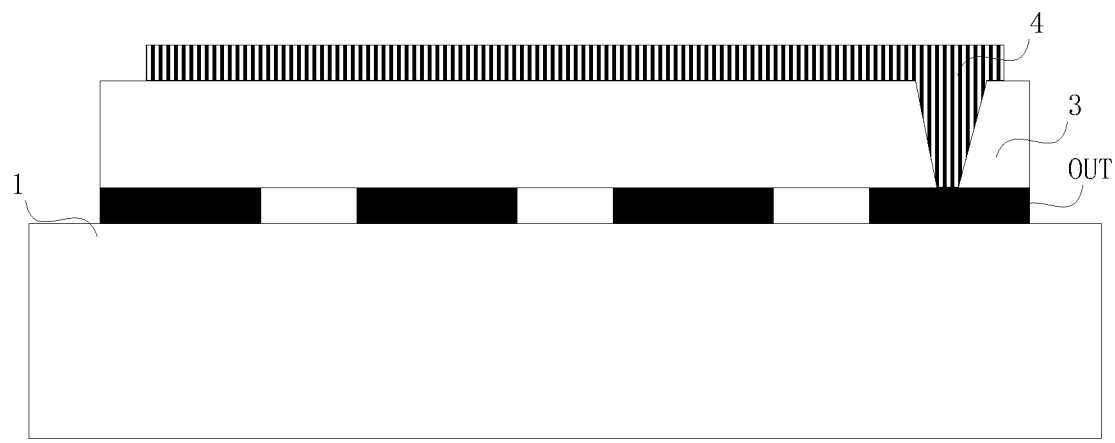
FIG. 13 is a schematic diagram of a cross-sectional structure of an array substrate along a cutting line AA' shown in FIG. 9 according to another embodiment of the present disclosure.

In some embodiments of the present disclosure, as shown in FIG. 13 which is a schematic diagram of a cross-sectional structure of an array substrate along a cutting line AA' shown in FIG. 9 according to another embodiment of the present disclosure, the micro driving device 3 includes a signal outputting terminal OUT. The touch driving electrode 4 is electrically connected to a signal outputting terminal OUT of the micro driving device 3 arranged corresponding to said touch driving electrode 4, to receive the touch driving signal outputted by the micro driving device 3 through the signal outputting terminal OUT.

Figure 14:
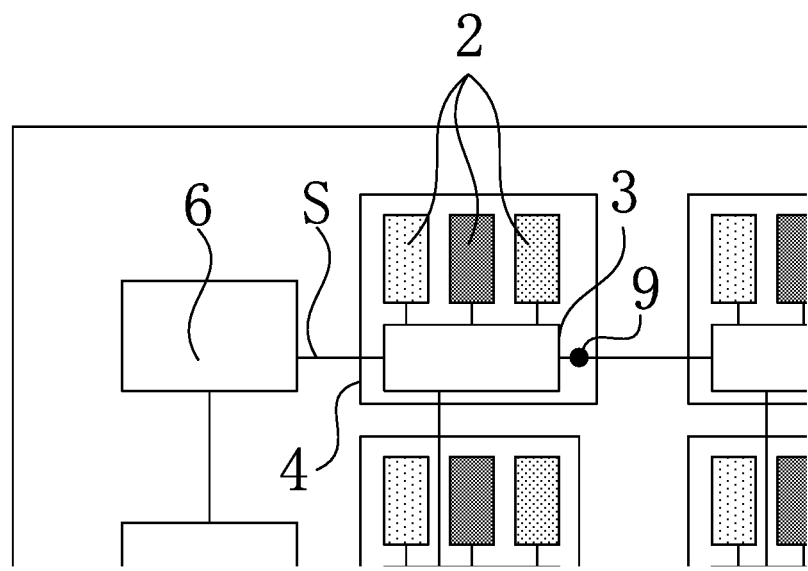
FIG. 14 is a partial top view structure diagram of an array substrate according to an embodiment of the present disclosure.

In some embodiments of the present disclosure, as shown in FIG. 14 which is a partial top view structure diagram of an array substrate according to an embodiment of the present disclosure, the array substrate further includes multiple scanning wires S arranged on the first substrate 1. The multiple scanning wires S are connected to the multiple micro driving devices 3 respectively. A scanning wire S is configured to provide the scanning signal to the micro driving device 3 connected to said scanning wire S. The touch driving electrode 4 is connected to the scanning wire S connected to the micro driving device 3 arranged corresponding to said touch driving electrode 4, for example, the touch driving electrode 4 is connected to the scanning wire S through a via hole 9, to receive the scanning signal through the scanning wire S and multiplex the scanning signal as the touch driving signal.

It should be noted that in the embodiment of the present disclosure, in order to simplify a manufacture process, in a case that a position relation between the micro driving device 3 and the touch driving electrode 4 and a position relation between the scanning wire S and the touch driving electrode 4 are determined, the touch driving electrode 4 may be connected to the scanning wire S or the scanning signal receiving terminal SIN of the micro driving device 3.

Figure 15:
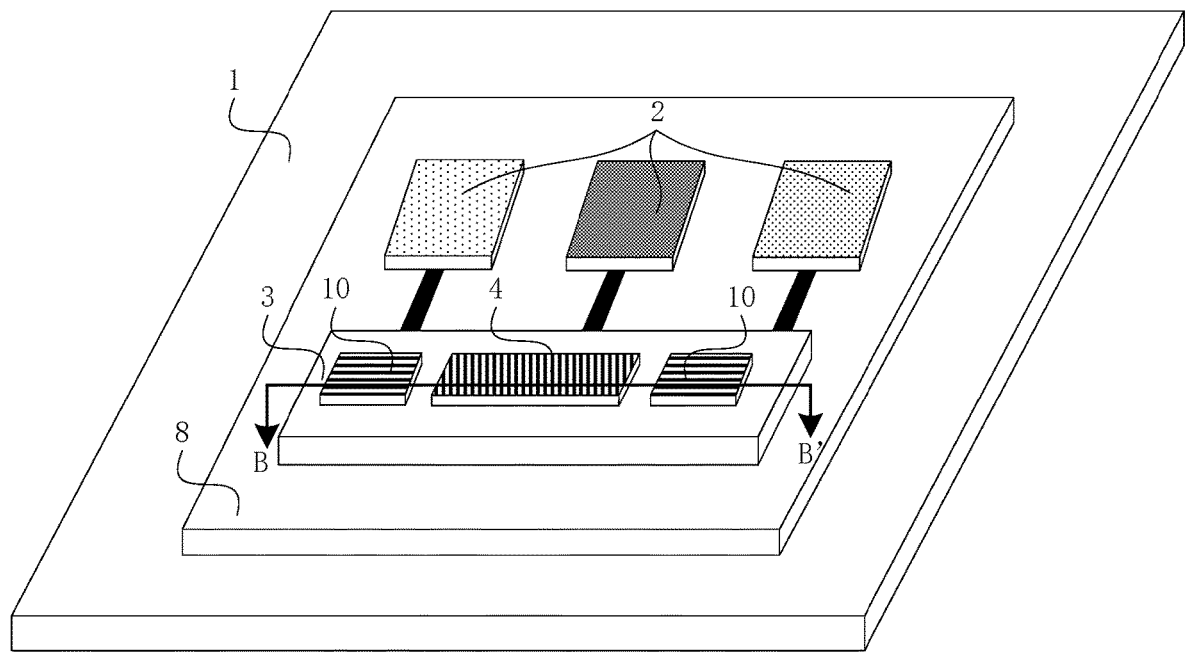
FIG. 15 is a three-dimensional schematic diagram of a partial structure of an array substrate according to another embodiment of the present disclosure.
Figure 16:
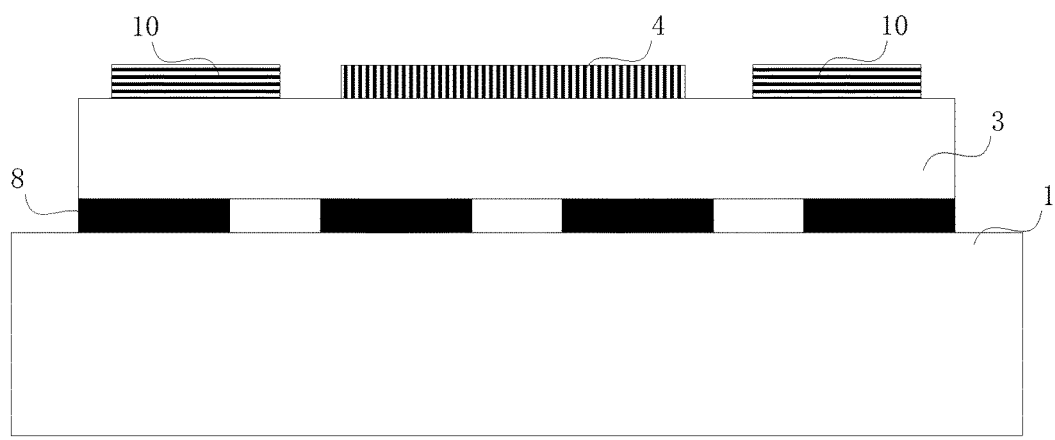
FIG. 16 is a schematic diagram of a cross-sectional structure of an array substrate along a cutting line BB' shown in FIG. 15 according to another embodiment of the present disclosure.

Based on any one of the above embodiments, in some embodiments of the present disclosure, as shown in FIG. 15 and FIG. 16, where FIG. 15 is a three-dimensional schematic diagram of a partial structure of an array substrate according to another embodiment of the present disclosure and FIG. 16 is a schematic diagram of a cross-sectional structure of an array substrate along a cutting line BB' shown in FIG. 15 according to another embodiment of the present disclosure, the array substrate further includes multiple touch sensing electrodes 10. The touch sensing electrode 10 is arranged corresponding to at least one touch driving electrode 4. Further, the touch sensing electrode 10 and touch driving electrode 4 are arranged in a same layer.

In an embodiment, the touch driving electrode 4 is arranged on a side of the micro driving device 3 arranged corresponding to said touch driving electrode 4 facing away from the first substrate 1, and the touch sensing electrode 10 is arranged on a side of the micro driving device 3 arranged corresponding to said touch driving electrode 4 facing away from the first substrate 1, to avoid the signal in the wire at the bottom of the micro driving device 3 from causing interference to the signals in the touch driving electrode 4 and the touch sensing electrode 10. In one embodiment, the present disclosure is not limited to this. In other embodiments, the touch driving electrode 4 and the touch sensing electrode 10 may be arranged on a side of the micro driving device 3 close to the first substrate 1.

In some embodiments of the present disclosure, in order to simply the design, the touch sensing electrode 10 and the touch driving electrode 4 are arranged on a surface of the micro driving device 3 on a side facing away from the first substrate 1, and at least one touch sensing electrode 10 and at least one touch driving electrode 4 are arranged on a surface of a same micro driving device 3 on a side facing away from the first substrate 1. In one embodiment, the present disclosure is not limited to this. In other embodiments, a flattened layer or an insulation layer and the like may be arranged between a film layer on which the touch sensing electrode 10 and the touch driving electrode 4 are arranged and the micro driving device 3, which is not repeated herein.

Figure 17:
FIG. 17 is a schematic diagram of a cross-sectional structure of an array substrate along a cutting line BB' shown in FIG. 15 according to another embodiment of the present disclosure.

In other embodiments of the present disclosure, as shown in FIG. 17 which is a schematic diagram of a cross-sectional structure of an array substrate along a cutting line BB' shown in FIG. 15 according to another embodiment of the present disclosure, the touch sensing electrode 10 and the touch driving electrode 4 may also be arranged in different layers. That is, a second substrate 11 may be arranged between the touch sensing electrode 10 and the touch driving electrode 4. In an embodiment of the present disclosure, the touch driving electrode 4 is arranged on a side of the micro driving device 3 facing away from the first substrate 1, the second substrate 11 is arranged on a side of the touch driving electrode 4 facing away from the first substrate 1, and the touch sensing electrode 10 is arranged on a side of the second substrate 11 facing away from the touch driving electrode 4.

In some embodiment of the present disclosure, in order to simply the design, the touch driving electrode 4 is arranged on the surface of the micro driving device 3 on a side facing away from the first substrate 1, the second substrate 11 is arranged on the surface of the touch driving electrode 4 on a side facing away from the first substrate 1, and the touch sensing electrode 10 is arranged on a surface of the second substrate 11 on a side facing away from the touch driving electrode 4.

Embodiments of the present disclosure, only the second substrate 11 is taken as an example for description. In other embodiments of the present disclosure, the second substrate 11 may be replaced by an insulation layer. In addition, a flattened layer or an insulation layer and the like may be arranged between a film layer on which the touch driving electrode 4 are arranged and the micro driving device 3, which is not repeated herein.

Based on any one of the above embodiments, in other embodiments of the present disclosure, in the direction perpendicular to the first substrate 1, a projection of a touch sensing electrode 10 is located at a peripheral region of a projection of a touch driving electrode 4 arranged corresponding to said touch sensing electrode 10, and at least partially surrounds the projection of the touch driving electrode 4, to perform touch detection through a mutual capacitor between the touch sensing electrode 10 and the touch driving electrode 4.

Figure 18:
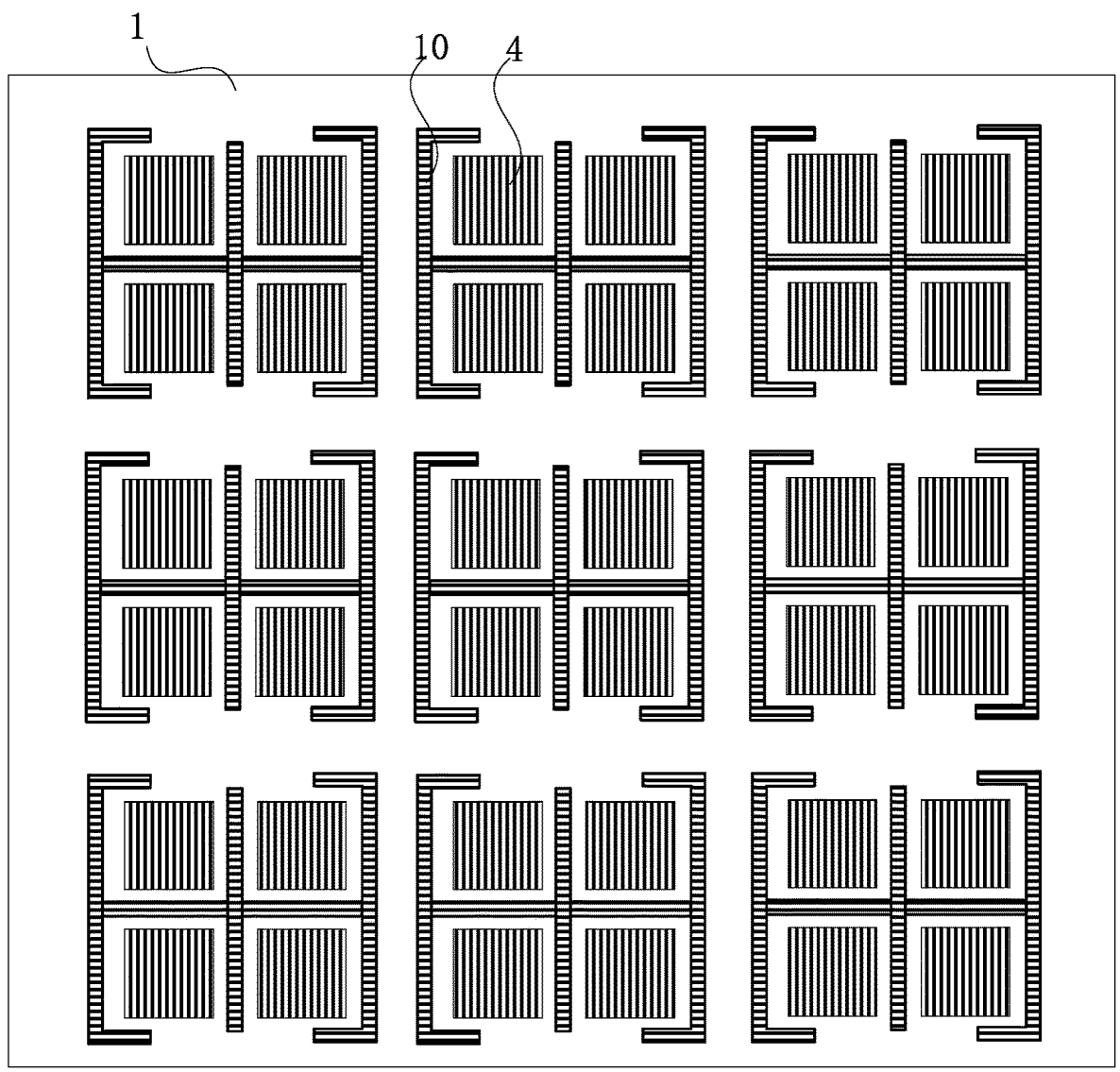
FIG. 18 is a schematic structure diagram of touch driving electrodes and touch sensing electrodes according to an embodiment of the present disclosure.

As shown in FIG. 18, FIG. 18 is a schematic structure diagram of touch driving electrodes 10 and touch sensing electrodes 4 according to an embodiment of the present disclosure. The projection of the touch driving electrode 4 is square, and the projection of the touch sensing electrode 10 is a "田" shape with gaps. In this case, the projection of the touch sensing electrode 10 partially surrounds the projection of the touch driving electrode 4.

Figure 19:
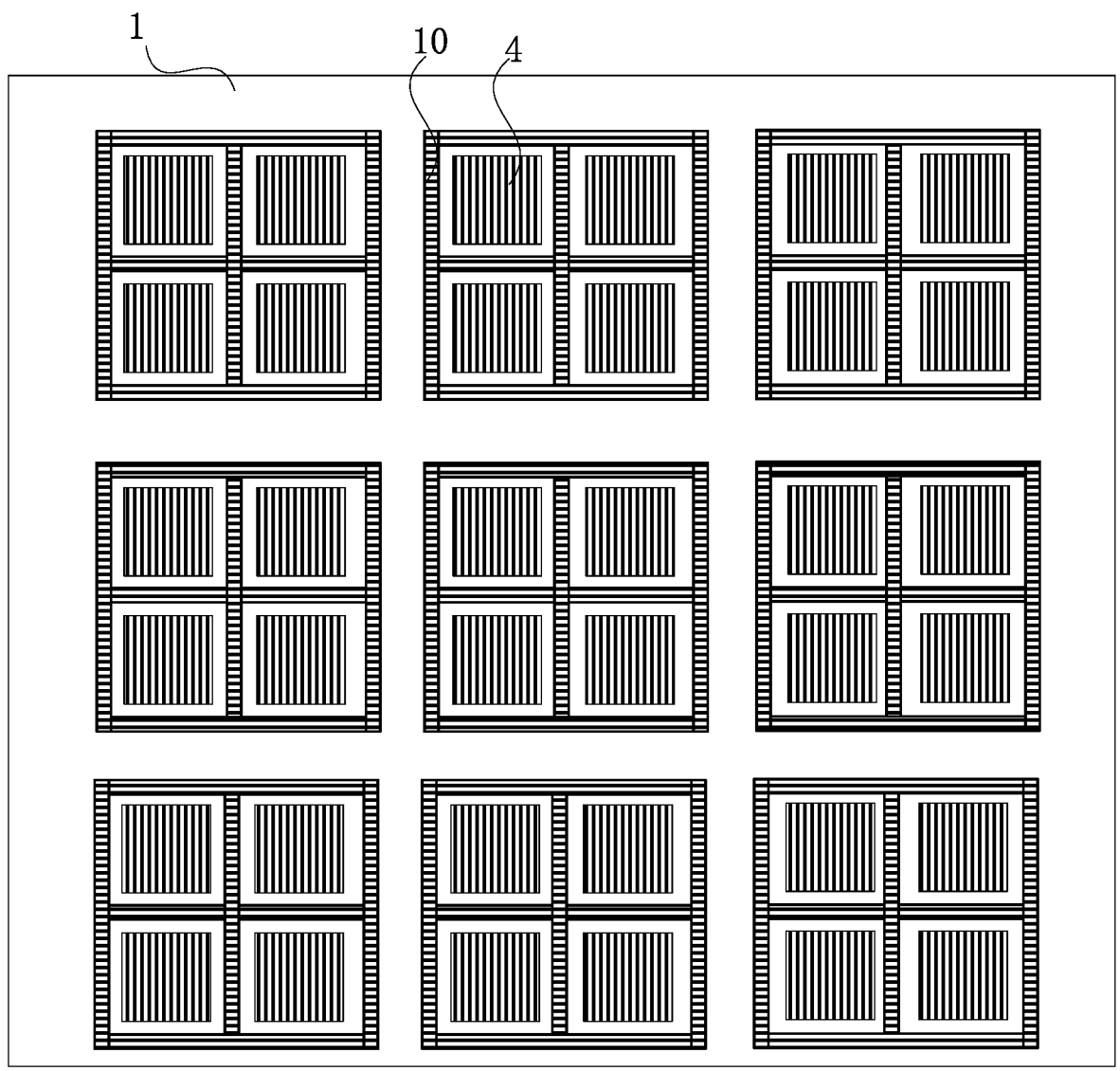
FIG. 19 is a schematic structure diagram of touch driving electrodes and touch sensing electrodes according to another embodiment of the present disclosure.

As shown in FIG. 19, FIG. 19 is a schematic structure diagram of touch driving electrodes 4 and touch sensing electrodes 10 according to another embodiment of the present disclosure. In the direction perpendicular to the first substrate 1, a shape of the projection of the touch sensing electrode 10 is a grid including at least two meshes, and a projection of a mesh encloses a projection of at least one touch driving electrode 4. In this case, the projection of the touch sensing electrode 10 completely surrounds the projection of the touch driving electrode 4.

In the structures shown in FIG. 18 and FIG. 19, only the projection of the touch driving electrode 4 is square, and the projection of the touch sensing electrode 10 is a "田" shape or an approximate "田" shape are taken as an example for description. In one embodiment, the present disclosure is not limited to this. In other embodiments, the projection of the touch sensing electrode 10 may also be a ring or an approximate ring, and the projection of the touch driving electrode 4 may also be a rhombus or a circle.

In an embodiment, a shape of the projection of the touch driving electrode 4 is similar to the shape of the projection of the touch sensing electrode 10, for example, both are approximate circle or approximate square, so that a distance between the touch sensing electrode 10 and the touch driving electrode 4 in each region is approximatively equal, hence, a touch detection sensitivity in each region between the touch sensing electrode 10 and the touch driving electrode 4 is approximatively equal, and a touch detection sensitivity of the entire substrate is basically consistent.

It should be noted that in the structures shown in FIG. 18 and FIG. 19, the touch driving electrode 4 and the touch sensing electrode 10 may be arranged on a same layer or on different layers, which is not limited in the present disclosure.

Figure 20:
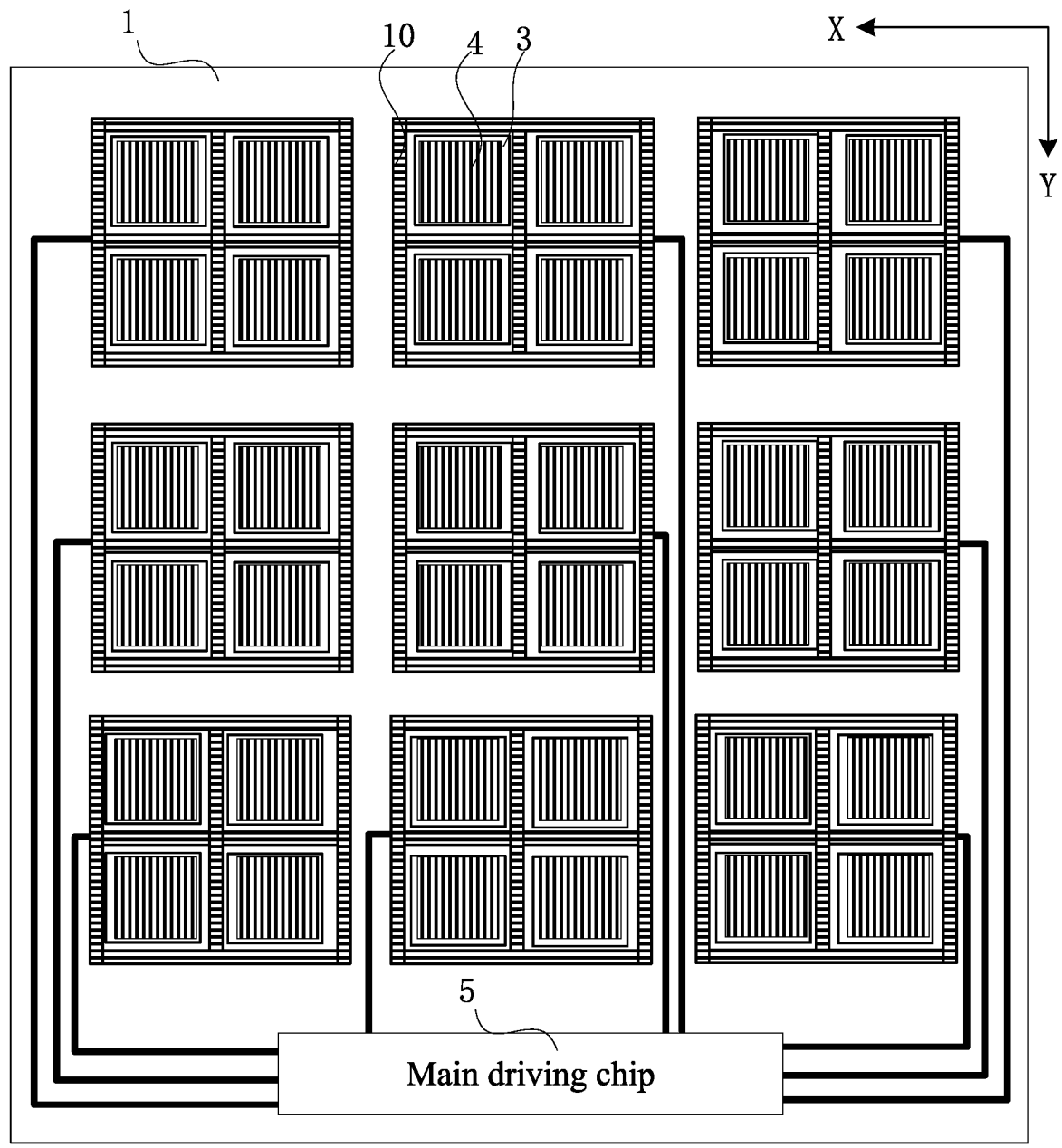
FIG. 20 is a schematic structure diagram of touch driving electrodes, touch sensing electrodes and a main driving chip according to an embodiment of the present disclosure.

Based on any one of the above embodiments, in other embodiments of the present disclosure, as shown in FIG. 20 which is a schematic structure diagram of touch driving electrodes 4, touch sensing electrodes 10 and a main driving chip 5 according to an embodiment of the present disclosure, multiple touch sensing electrodes 10 are arranged in an array and multiple micro driving devices 3 are arranged in an array. For example, multiple touch sensing electrodes 10 are arranged in an array along a first direction Y and a second direction X, and multiple micro driving devices 3 are arranged in an array along the first direction Y and the second direction X. In this case, a position of each touch sensing electrode 10, that is, an X coordinate and a Y coordinate, is known.

Each touch sensing electrode 10 is arranged corresponding to the touch driving electrode 4 arranged corresponding to at least one micro driving device 3. For example, a projection of each touch sensing electrode 10 on the first substrate 1 surrounds projections of multiple touch driving electrodes 4 on the first substrate 1, and the projection of each touch driving electrode 4 on the first substrate 1 overlaps with the projection of one micro driving device 3 on the first substrate 1. Further, the main driving chip 5 is connected to multiple touch sensing electrodes 10 to determine, in a case that any one of the multiple touch sensing electrodes 10 outputs a sensing signal, a touch position based on a position of the touch sensing electrode 10.

In one embodiment, the micro driving device 3 inputs the touch driving signal to the touch driving electrode 4 arranged corresponding to said micro driving device 3. Since each touch sensing electrode 10 is arranged corresponding to the touch driving electrode 4 corresponding to at least one micro driving device 3, a mutual capacitor is formed between the touch sensing electrode 10 and the touch driving electrode 4 corresponding to said touch sensing electrode 10. In a case that a touch occurs, a capacitance of the mutual capacitor between the touch sensing electrode 10 and the touch driving electrode 4 in the touch position changes, the touch sensing electrode 10 outputs the sensing signal to the main driving chip 5, and the main driving chip 5 determines the touch position based on the position (including the X coordinate and the Y coordinate) of the touch sensing electrode 10.

It should be noted that the touch driving signal inputted by the micro driving device 3 to the touch driving electrode 4 arranged corresponding to said micro driving device 3 is the scanning signal. Further the inputted scanning signals may be synchronous such as the second sub-signal G2 as shown in FIG. 5, or not be synchronous such as the scanning signal as shown in FIG. 8. In one embodiment, the touch driving signal inputted by the micro driving device 3 to the touch driving electrode 4 arranged corresponding to said micro driving device 3 may be a signal generated independently, which may be set based on actual needs.

Figure 21:
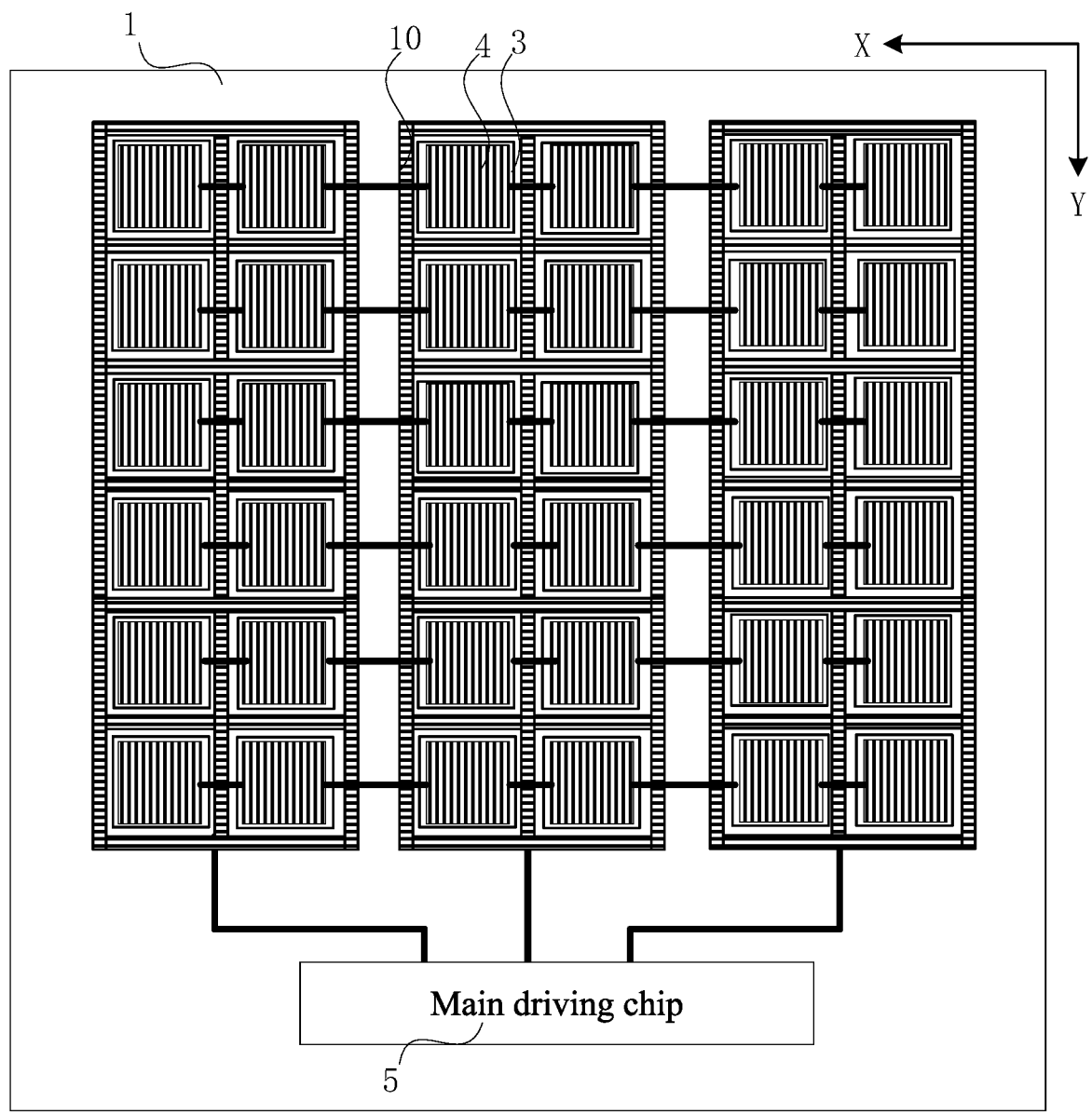
FIG. 21 is a schematic structure diagram of touch driving electrodes, touch sensing electrodes and a main driving chip according to another embodiment of the present disclosure.

In other embodiments of the present disclosure, as shown in FIG. 21 which is a schematic structure diagram of touch driving electrodes 4, touch sensing electrodes 10 and a main driving chip 5 according to another embodiment of the present disclosure, each touch sensing electrode 10 may extend along the first direction Y, and the multiple touch sensing electrodes 10 are arranged along the second direction X, where the first direction Y intersects the second direction X. The multiple micro driving devices 3 are arranged in an array along the first direction Y and the second direction X, with the second direction X as a row direction, and the touch driving electrodes 4 arranged corresponding to micro driving devices 3 in one row are electrically connected.

The main driving chip 5 is connected to the multiple touch sensing electrodes 10 respectively, and is electrically connected to the multiple micro driving devices 3. The main driving chip 5 is configured to determine, in a case of receiving a sensing signal outputted by any one of the touch sensing electrodes 10, the touch position based on the position of the touch sensing electrode 10 and the position of the micro driving device 3 which is outputting the touch driving signal or receiving the scanning signal.

Figure 22:
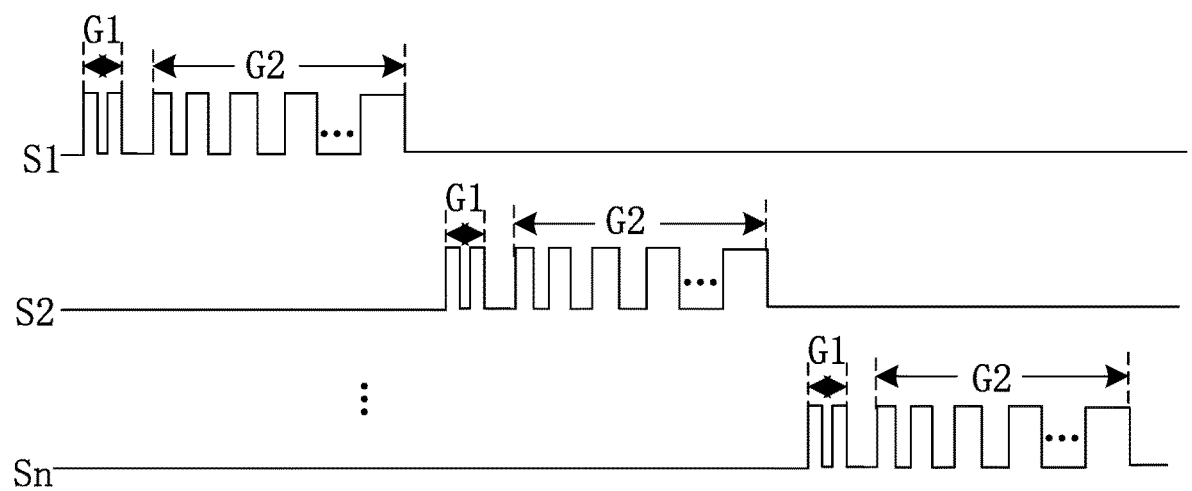
FIG. 22 is a timing diagram of scanning signals S1 to Sn in each row according to another embodiment of the present disclosure.

In an embodiment, a timing diagram of the scanning signal is shown in FIG. 22, which is a timing diagram of scanning signals S1 to Sn in each row according to another embodiment of the present disclosure. Multiple row driving devices 6 input the scanning signal to the micro driving devices 3 row by row. In a case that a touch occurs, the capacitance of the mutual capacitor between the touch sensing electrode 10 and the touch driving electrode 4 at the touch position changes. The touch sensing electrode 10 outputs the sensing signal to the main driving chip 5, the main driving chip 5 determines the X coordinate based on a coordinate of the touch sensing electrode 10, and determines the Y coordinate based on a coordinate of a row where the micro driving device 3 that is inputting the scanning signal is arranged. Thus, the touch position can be determined according to the X coordinate and the Y coordinate.

In an embodiment, the touch driving signal generated by the micro driving device 3 is inputted to the touch driving electrodes 4 in different rows in a time division manner. Since the micro driving device 3 is connected to the main driving chip 5, the main driving chip 5 may acquire a time when micro driving devices 3 in each row output the touch driving signal. In a case that a touch occurs, the main driving chip 5 determines the X coordinate based on the coordinate of the touch sensing electrode 10, and determines the Y coordinate based on the coordinate of the row where the micro driving device 3 that is outputting the touch driving signal is arranged. Thus, the touch position can be determined according to the X coordinate and the Y coordinate.

Figure 23:
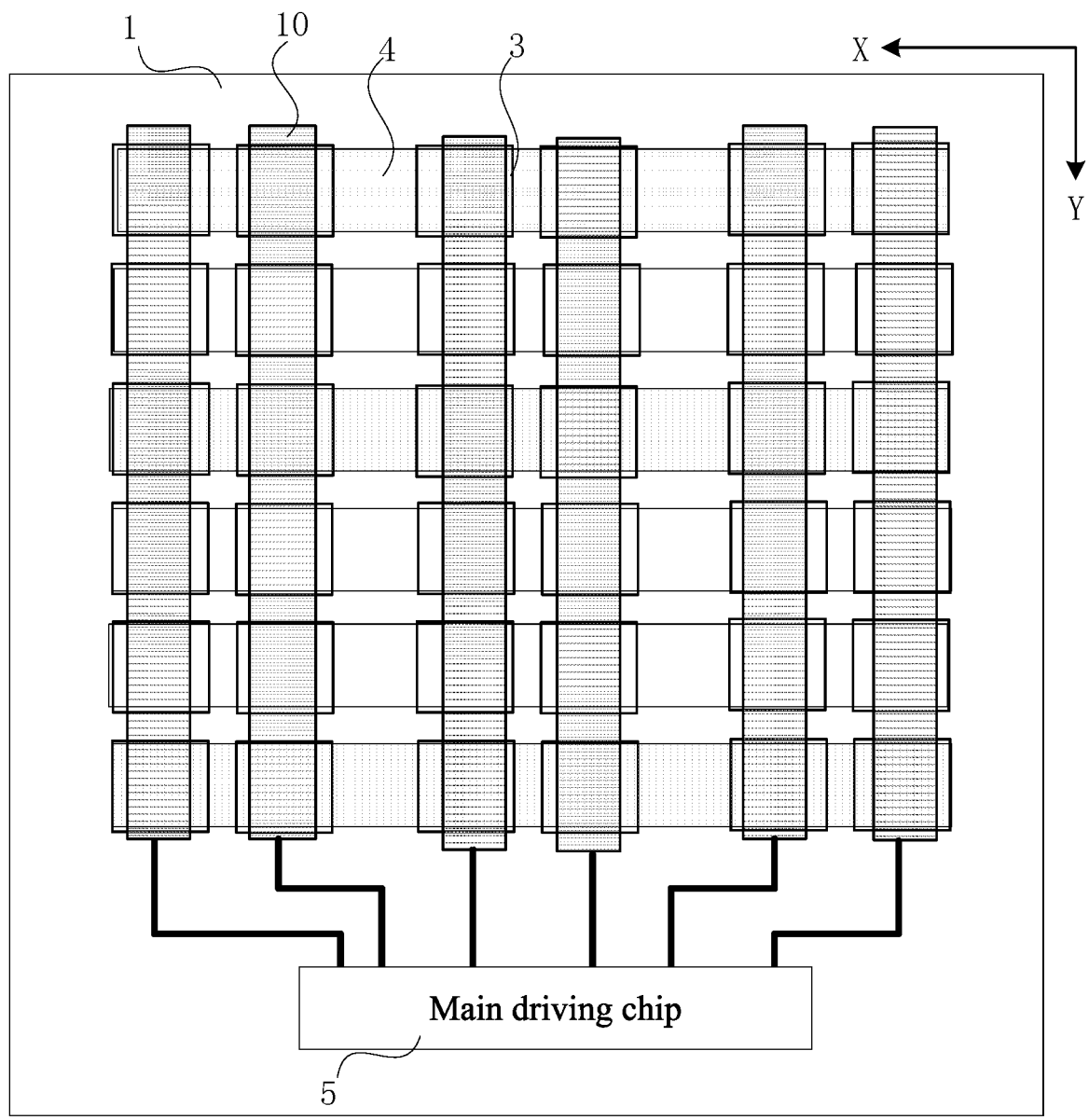
FIG. 23 is a schematic structure diagram of touch driving electrodes, touch sensing electrodes and a main driving chip according to another embodiment of the present disclosure.

In the structures shown in FIG. 20 and FIG. 21, only the touch sensing electrode 10 is the grid and the projection of the touch driving electrode 4 is square are taken as an example for description. In one embodiment, the present disclosure is not limited to this. In other embodiments, as shown in FIG. 23 which is a schematic structure diagram of touch driving electrodes 4, touch sensing electrodes 10 and a main driving chip 5 according to another embodiment of the present disclosure, the touch driving electrode 10 may be a strip electrode extending along the first direction Y, and the touch driving electrode 4 may be a strip electrode extending along the second direction X.

Figure 24:
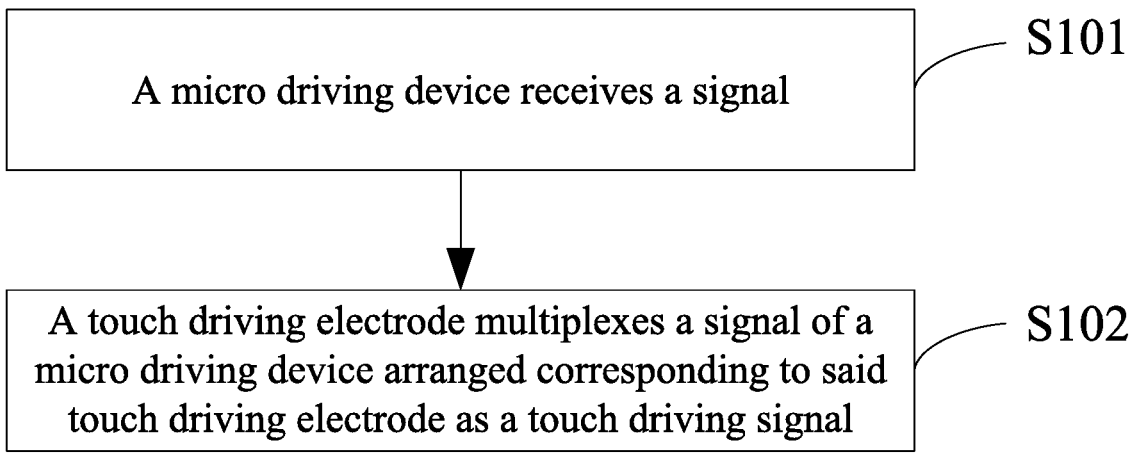
FIG. 24 is a flowchart of a driving method of an array substrate according to an embodiment of the present disclosure.

A driving method of an array substrate is further provided according to an embodiment of the present disclosure. The array substrate includes multiple micro light emitting devices, multiple micro driving devices and multiple touch driving electrodes. The driving method is applied to the array substrate according to any one of the above embodiments, as shown in FIG. 24 which is a flowchart of a driving method of an array substrate according to an embodiment of the present disclosure. The method includes steps S101 and S102.

In step S101, a micro driving device receives a signal.

In step S102, a touch driving electrode multiplexes a signal of a micro driving device arranged corresponding to said touch driving electrode as a touch driving signal.

Referring to FIG. 1 to FIG. 4, in the array substrate according to an embodiment of the present disclosure, at least one touch driving electrode 4 is arranged corresponding to at least one micro driving device 3. In some embodiments of the present disclosure, the touch driving electrode 4 may multiplex the signal transmitted to the micro driving device 3 arranged corresponding to said touch driving electrode 4 as the touch driving signal. That is, after micro driving devices 3 receives signals, each touch driving electrode 4 receives the signal transmitted to the micro driving device 3 arranged corresponding to said touch driving electrode 4 as the touch driving signal. In this way, there is no need for the main driving chip to specifically generate the touch driving signal, which greatly reduces the power consumption of the main driving chip.

Figure 25:
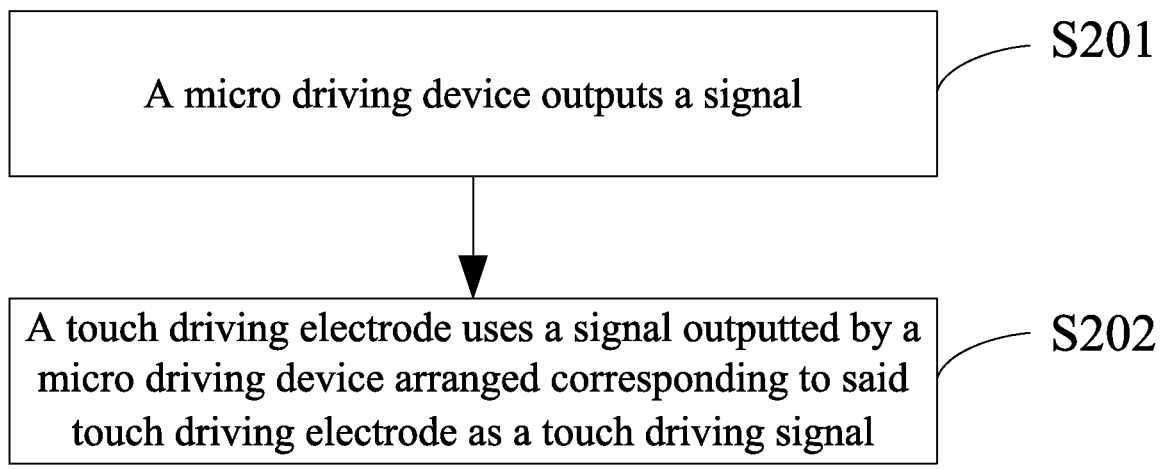
FIG. 25 is a flowchart of a driving method of an array substrate according to another embodiment of the present disclosure.

In one embodiment, as shown in FIG. 25 which is a flowchart of a driving method of an array substrate according to another embodiment of the present disclosure, the method includes steps S201 and S202.

In step S201, a micro driving device outputs a signal.

In step S202, a touch driving electrode uses a signal outputted by a micro driving device arranged corresponding to said touch driving electrode as a touch driving signal.

In other embodiments of the present disclosure, the touch driving signal may be generated by the micro driving device 3. That is, after micro driving devices 3 output signals, each touch driving electrode 4 receives the signal outputted by the micro driving device 3 arranged corresponding to said touch driving electrode 4 as the touch driving signal. Since the touch driving signal of each touch driving electrode 4 is generated by the micro driving device 3 arranged corresponding to said touch driving electrode 4, there is no need for the main driving chip to generate the touch driving signal, which greatly reduces the power consumption of the main driving chip. In addition, each micro driving device 3 is only required to generate the touch driving signal for the touch driving electrode 4 arranged corresponding to said micro driving device 3, hence, for an array substrate including multiple micro driving devices 3, the power consumption of each micro driving device 3 is not high, so that the power consumption of the entire array substrate is also relatively low.

In some embodiments of the present disclosure, the touch driving electrode multiplexing the signal of the corresponding micro driving device as the touch driving signal includes: the touch driving electrode multiplexes a scanning signal of the corresponding micro driving device as the touch driving signal.

Further, in some embodiments of the present disclosure, as shown in FIG. 5, the scanning signal includes a first sub-signal G1 and a second sub-signal G2. The touch driving electrode multiplexing the scanning signal of the corresponding micro driving device as the touch driving signal includes: the touch driving electrode multiplexes the second sub-signal of the corresponding micro driving device as the touch driving signal.

As shown in FIG. 5, since the micro driving devices 3 in all rows receive the second sub-signals G2 synchronously during the T2 period, the touch driving electrode 4 multiplexes the second sub-signal G2 in the scanning signal as the touch driving signal, which can make all touch driving electrodes 4 to perform touch detection synchronously. In one embodiment, the present disclosure is not limited to this. In other embodiments of the present disclosure, the second sub-signals G2 of the micro driving devices 3 in different rows are not synchronized. In this case, the touch driving electrodes 4 receive the touch driving signal in a time division manner, that is, the touch driving electrodes 4 perform touch detection at different time.

Based on any one the above embodiments, in some embodiments of the present disclosure, as shown in FIG. 20, the array substrate further includes multiple touch sensing electrodes 10 arranged in an array. The method further includes: receiving a sensing signal outputted by any one of the multiple touch sensing electrodes 10; and determining a touch position based on a position of the touch sensing electrode 10.

In one embodiment, the micro driving device 3 inputs the touch driving signal to the touch driving electrode 4 arranged corresponding to said micro driving device 3. Since each touch sensing electrode 10 is arranged corresponding to the touch driving electrode 4 corresponding to at least one micro driving device 3, a mutual capacitor is formed between the touch sensing electrode 10 and the touch driving electrode 4 corresponding to said touch sensing electrode 10. In a case that a touch occurs, a capacitance of the mutual capacitor between the touch sensing electrode 10 and the touch driving electrode 4 in the touch position changes, the touch sensing electrode 10 outputs the sensing signal to the main driving chip 5, and the main driving chip 5 determines the touch position based on the position (including the X coordinate and the Y coordinate) of the touch sensing electrode 10.

In other embodiments of the present disclosure, as shown in FIG. 21, the array further includes multiple touch sensing electrodes 10 extending along the first direction and arranged along the second direction. The method further includes: receiving a sensing signal outputted by any one of the multiple touch sensing electrodes 10; and determining a touch position based on a position of the touch sensing electrode 10 and a position of a micro driving device 3 that is outputting the touch driving signal or receiving the scanning signal.

In a case that a touch occurs, the capacitance of the mutual capacitor between the touch sensing electrode 10 and the touch driving electrode 4 at the touch position changes. The touch sensing electrode 10 outputs the sensing signal to the main driving chip 5, the main driving chip 5 determines the X coordinate based on a coordinate of the touch sensing electrode 10, and determines the Y coordinate based on a coordinate of a row where the micro driving device 3 that is inputting the scanning signal is arranged. Thus, the touch position can be determined according to the X coordinate and the Y coordinate.

Figure 26:
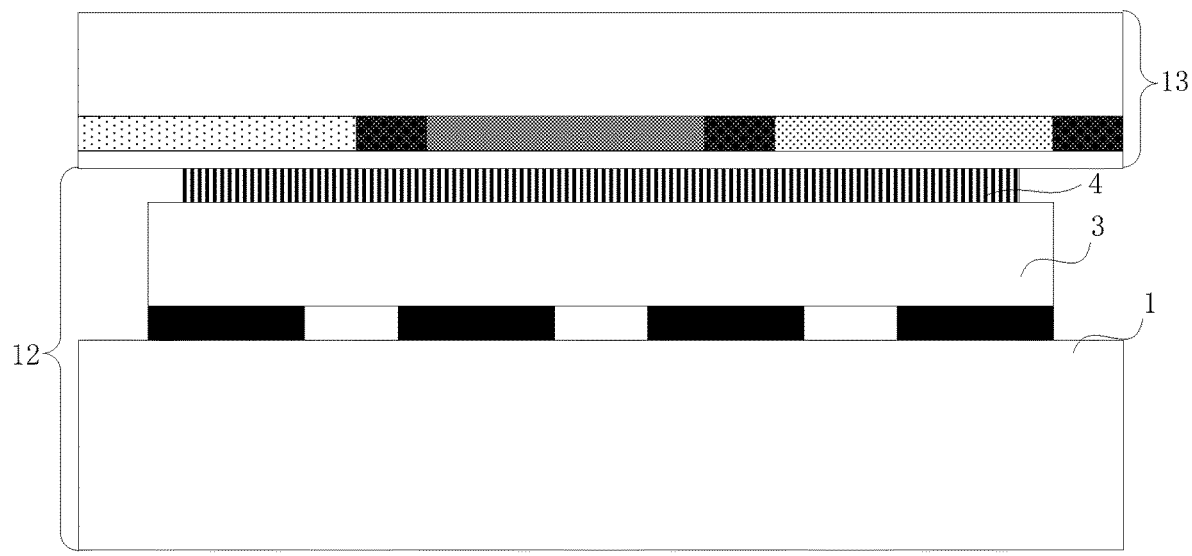
FIG. 26 is a partial cross-sectional structure diagram of a touch display panel according to an embodiment of the present disclosure.

A touch display panel is further provided according to an embodiment of the present disclosure, as shown in FIG. 26 which is a partial cross-sectional structure diagram of a touch display panel according to an embodiment of the present disclosure. The touch display panel includes an array substrate 12 and a color filter substrate 13 arranged opposite to the array substrate 12. The array substrate 12 is the array substrate according to any one of the above embodiments. The color filter substrate 13 includes a color resist layer 130, and the color resist layer 130 includes color resists of multiple colors and a black matrix, where the color resist is arranged corresponding to a micro light emitting device of the same color.

Figure 27:
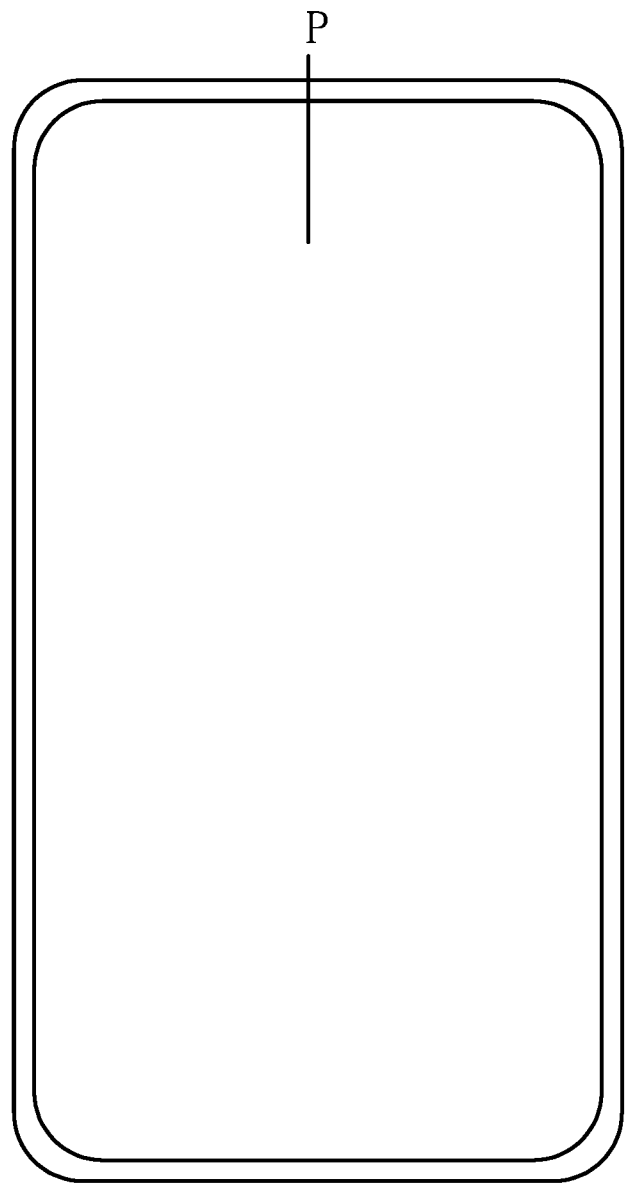
FIG. 27 is a schematic diagram of a touch display device according to an embodiment of the present disclosure.

A touch display device is further provided according to an embodiment of the present disclosure, as shown in FIG. 27 which is a schematic diagram of a touch display device according to an embodiment of the present disclosure. The touch display device P includes the touch display panel according to the above embodiment. In the embodiment of the present disclosure, the touch display device includes but is not limited to a smart wristband, a smart phone, a tablet computer, a digital camera and the like.

The embodiments of the present disclosure are described in a progressive manner, and each embodiment places emphasis on the difference from other embodiments. Therefore, for the same or similar parts between the embodiments, one may refer to the description of other embodiments. For the device disclosed in the embodiments, since it corresponds to the method disclosed in the embodiments, the description is relatively simple, and the relevant parts can be referred to the description of the method part.

What is claimed is:

1. A touch display panel, comprising:
   a first substrate; and
   a plurality of micro light emitting devices, a plurality of micro driving devices and a plurality of touch driving electrodes, arranged on a side of the first substrate, wherein
   each of the plurality of micro driving devices corresponds to the plurality of micro light emitting devices to drive the plurality of micro light emitting devices to emit light;
   at least one of the plurality of touch driving electrodes corresponds to at least one of the plurality of micro driving devices, and a projection of at least one of the plurality of touch driving electrodes overlaps with a projection of at least one of the plurality of the micro driving devices in a direction perpendicular to the first substrate; and
   the at least one of the plurality of touch driving electrode receives a signal transmitted to a corresponding micro driving device as a touch driving signal, or, the at least one of the plurality of touch driving electrode receives a signal outputted by the corresponding micro driving device as the touch driving signal.

2. The touch display panel according to claim 1, wherein the at least one of a plurality of touch driving electrode receives a scanning signal of the corresponding micro driving device, and multiplexes the scanning signal as the touch driving signal.

3. The touch display panel according to claim 2, wherein the scanning signal comprises a first sub-signal and a second sub-signal, wherein
   each of a plurality of micro driving device receives a data signal of a corresponding micro light emitting device after receiving the first sub-signal, and drives, based on the second sub-signal and the data signal, the corresponding micro light emitting device to emit light after receiving the second sub-signal; and
   the at least one of the plurality of touch driving electrode multiplexes the second sub-signal of the scanning signal as the touch driving signal.

4. The touch display panel according to claim 3, wherein the second sub-signal comprises at least two pulse signals with different pulse widths.

5. The touch display panel according to claim 1, wherein the at least one of a plurality of touch driving electrode is arranged on a surface of the corresponding micro driving device on a side facing away from the first substrate.

6. The touch display panel according to claim 2, wherein each of the plurality of micro driving devices comprises a scanning signal receiving terminal, and receives the scanning signal through the scanning signal receiving terminal;
   wherein the at least one of the plurality of touch driving electrodes is electrically connected to a scanning signal receiving terminal of the corresponding micro driving device to receive the scanning signal through the scanning signal receiving terminal.

7. The touch display panel according to claim 1, wherein each of the plurality of micro driving devices comprises a signal outputting terminal, and the at least one of the plurality of touch driving electrodes is electrically connected to a signal outputting terminal of the corresponding micro driving device, to receive the touch driving signal outputted by the corresponding micro driving device through the signal outputting terminal.

8. The touch display panel according to claim 1, wherein the touch display panel further comprises a plurality of scanning wires arranged on the first substrate, the plurality of scanning wires are connected to the plurality of micro driving devices respectively, and each of the plurality of scanning wires is configured to provide a scanning signal to a micro driving device connected to said scanning wire;

wherein the at least one of the plurality of touch driving electrodes is connected to a scanning wire connected to the corresponding micro driving device to receive the scanning signal through the scanning wire.

9. The touch display panel according to claim 1, wherein the touch display panel further comprises a plurality of touch sensing electrodes, and the plurality of touch sensing electrodes correspond to at least one of the plurality of touch driving electrode;

wherein the plurality of touch sensing electrode and the plurality of touch driving electrodes are arranged on a same layer, and the plurality of touch sensing electrodes are arranged on a side of a micro driving device corresponding to the at least one of the plurality of touch driving electrodes facing away from the first substrate.

10. The touch display panel according to claim 1, wherein the touch display panel further comprises a plurality of touch sensing electrodes, and the plurality of touch sensing electrodes correspond to at least one of the plurality of touch driving electrode;

wherein a second substrate is arranged between the plurality of touch sensing electrode and the plurality of touch driving electrode, the second substrate is arranged on a side of the plurality of touch driving electrode facing away from the first substrate, and the plurality of touch sensing electrodes is arranged on a side of the second substrate or an insulation layer facing away from the plurality of touch driving electrodes.

11. The touch display panel according to claim 1, wherein the touch display panel further comprises a plurality of touch sensing electrodes, and the plurality of touch sensing electrodes correspond to at least one of the plurality of touch driving electrode;

wherein in a direction perpendicular to the first substrate, a projection of a touch sensing electrode is located at a peripheral region of a projection of a corresponding touch driving electrode, and at least partially surrounds the projection of the corresponding touch driving electrode.

12. The touch display panel according to claim 11, wherein in the direction perpendicular to the first substrate, a shape of the projection of a touch sensing electrode is a grid comprising at least two meshes, and a projection of a mesh encloses at least a projection of at least one touch driving electrode.

13. The touch display panel according to claim 1, wherein the touch display panel further comprises a main driving chip and a plurality of touch sensing electrodes;

wherein the plurality of touch sensing electrodes are arranged in an array, the plurality of micro driving devices are arranged in an array, and each of the plurality of touch sensing electrode corresponds to at least one touch driving electrode corresponding to at least one of a plurality of micro driving device; and wherein the main driving chip is connected to the plurality of touch sensing electrodes respectively, to determine, in a case that any one of the plurality of touch sensing electrodes outputs a sensing signal, a touch position based on a position of a touch sensing electrode.

14. The touch display panel according to claim 1, wherein the touch display panel further comprises a main driving chip and a plurality of touch sensing electrodes;

wherein each of the plurality of touch sensing electrodes extends along a first direction, the plurality of touch sensing electrodes are sequentially arranged along a second direction, and the first direction intersects the second direction;

wherein the plurality of micro driving devices are arranged in an array along the first direction and the second direction, with the second direction as a row direction, and touch driving electrodes corresponding to micro driving devices in a same row are electrically connected; and wherein the main driving chip is connected to the plurality of touch sensing electrodes respectively, and connected to the plurality of micro driving devices respectively, wherein the main driving chip is configured to determine, in a case of receiving a sensing signal outputted by any one of the plurality of touch sensing electrodes, a touch position based on a position of a touch sensing electrode and a position of a micro driving device which is outputting the touch driving signal or receiving a scanning signal.

15. A touch driving method of a touch display panel, wherein the touch display panel comprises a plurality of micro light emitting devices, a plurality of micro driving devices and a plurality of touch driving electrodes, and a projection of at least one of the plurality of touch driving electrodes overlaps with a projection of at least one of the plurality of the micro driving devices in a direction perpendicular to the first substrate, and the method comprises:

receiving a signal by a micro driving device; and multiplexing, by a touch driving electrode, a signal of a micro driving device arranged corresponding to said touch driving electrode as a touch driving signal;

or outputting a signal by a micro driving device; and using, by a touch driving electrode, a signal outputted by a micro driving device arranged corresponding to said touch driving electrode as a touch driving signal.

16. The touch driving method according to claim 15, wherein the multiplexing, by a touch driving electrode, a signal of a micro driving device arranged corresponding to said touch driving electrode as a touch driving signal comprises:

multiplexing, by the touch driving electrode, a scanning signal of the micro driving device arranged corresponding to said touch driving electrode as the touch driving signal.

17. The touch driving method according to claim 16, wherein the scanning signal comprises a first sub-signal and a second sub-signal, and the multiplexing, by the touch driving electrode, a scanning signal of the micro driving device arranged corresponding to said touch driving electrode as the touch driving signal comprises:

multiplexing, by the touch driving electrode, the second sub-signal of the micro driving device arranged corresponding to said touch driving electrode as the touch driving signal.

18. The method according to claim 15, wherein the touch display panel further comprises a plurality of touch sensing electrodes that are arranged in an array, and the method further comprises:

receiving a sensing signal outputted by any one of the plurality of touch sensing electrodes; and determining a touch position based on a position of said touch sensing electrode.

19. The method according to claim 15, wherein the touch display panel further comprises a plurality of touch sensing electrodes extending along a first direction and arranged along a second direction, and the method further comprises:
receiving a sensing signal outputted by any one of the plurality of touch sensing electrodes; and
determining a touch position based on a position of said touch sensing electrode and a position of a micro driving device that is outputting the touch driving signal or receiving a scanning signal.

20. A touch display device comprising:
a touch display panel, comprising:
a first substrate; and
a plurality of micro light emitting devices, a plurality of micro driving devices and a plurality of touch driving electrodes, arranged on a side of the first substrate, wherein
each of the plurality of micro driving devices corresponds to the plurality of micro light emitting devices to drive the plurality of micro light emitting devices to emit light;
at least one of the plurality of touch driving electrodes corresponds to at least one of the plurality of micro driving devices;
the at least one of the plurality of touch driving electrode receives a signal transmitted to a corresponding micro driving device as a touch driving signal, or, the at least one of the plurality of touch driving electrode receives a signal outputted by the corresponding micro driving device as the touch driving signal;
the at least one of a plurality of touch driving electrode receives a scanning signal of the corresponding micro driving device, and multiplexes the scanning signal as the touch driving signal;
the scanning signal comprises a first sub-signal and a second sub-signal, each of a plurality of micro driving device receives a data signal of a corresponding micro light emitting device after receiving the first sub-signal, and drives, based on the second sub-signal and the data signal, the corresponding micro light emitting device to emit light after receiving the second sub-signal, and the at least one of the plurality of touch driving electrode multiplexes the second sub-signal of the scanning signal as the touch driving signal; and
the second sub-signal comprises at least two pulse signals with different pulse widths.

\* \* \* \* \*